(12) United States Patent
Hanawa

(10) Patent No.: US 9,204,009 B2
(45) Date of Patent: Dec. 1, 2015

(54) IMAGE FORMING APPARATUS

(75) Inventor: Keiko Hanawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1135 days.

(21) Appl. No.: 12/485,331

(22) Filed: Jun. 16, 2009

(65) Prior Publication Data

US 2009/0316163 A1   Dec. 24, 2009

(30) Foreign Application Priority Data

Jun. 20, 2008   (JP) ................................. 2008-162472

(51) Int. Cl.
    *H04N 1/387*     (2006.01)
    *H04N 1/00*     (2006.01)

(52) U.S. Cl.
    CPC ......... *H04N 1/3873* (2013.01); *H04N 1/00366* (2013.01); *H04N 1/00374* (2013.01); *H04N 1/00376* (2013.01); *H04N 1/00379* (2013.01); *H04N 1/00968* (2013.01); *H04N 1/3871* (2013.01); *H04N 1/3878* (2013.01); *H04N 1/0035* (2013.01); *H04N 2201/0082* (2013.01); *H04N 2201/0091* (2013.01)

(58) Field of Classification Search
None
See application file for complete search history.

(56) References Cited

U.S. PATENT DOCUMENTS 5,708,515 A * 1/1998 Nishiura ...................... 358/473
2005/0185204 A1 * 8/2005 Shelton et al. ............... 358/1.13

FOREIGN PATENT DOCUMENTS

| CN | 1539646 A | 10/2004 |
|---|---|---|
| CN | 1734469 A | 2/2006 |
| JP | 2000118072 A | 4/2000 |
| JP | 2003-080789 A | 3/2003 |
| JP | 2007-049620 A | 2/2007 |
| JP | 2007049638 A | 2/2007 |

OTHER PUBLICATIONS

JP 2007-049638 Machine Translation.*

* cited by examiner

*Primary Examiner* — Saeid Ebrahimi Dehkordy
*Assistant Examiner* — Lennin Rodriguezgonzalez
(74) *Attorney, Agent, or Firm* — Canon USA, Inc. IP Division

(57) ABSTRACT

An image forming apparatus according to embodiments of the present invention prints an image including a writing region for a user to write on onto a recording sheet, scans the recording sheet whose writing region is written in, combines an image extracted from the scanned image with a background image, and prints it. The apparatus prints a mark indicating the writing region on the recording sheet and cuts out a partial region including the position of the mark after the scanning. The apparatus features extracting an image in a region showing a content written in the writing region from an image that is cut out and rotated in accordance with the orientation of the background image on the basis of the mark image. This allows images to be combined with little misalignment even if the handwriting combining sheet is placed in an inclined state on a document plate.

21 Claims, 28 Drawing Sheets

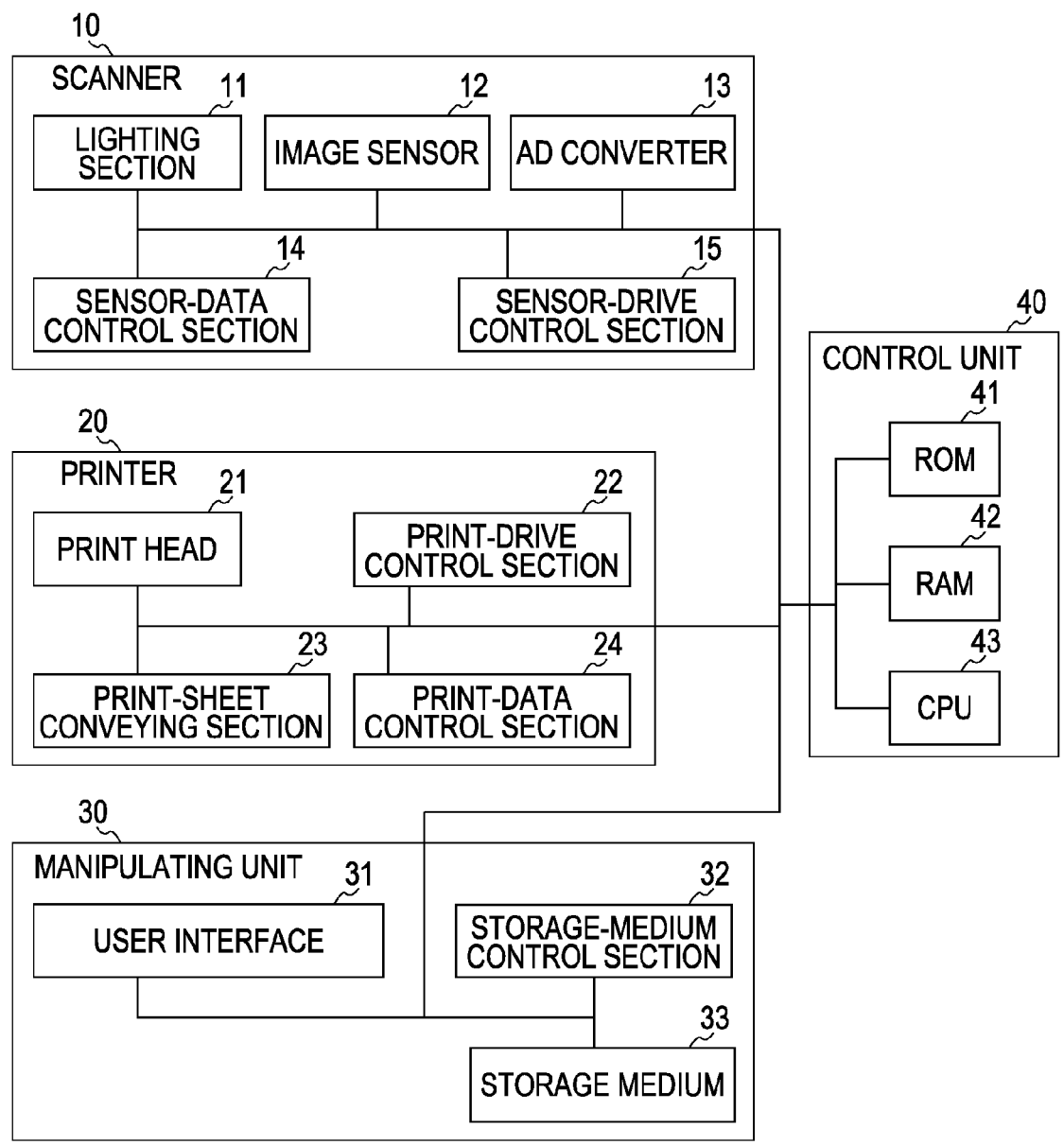

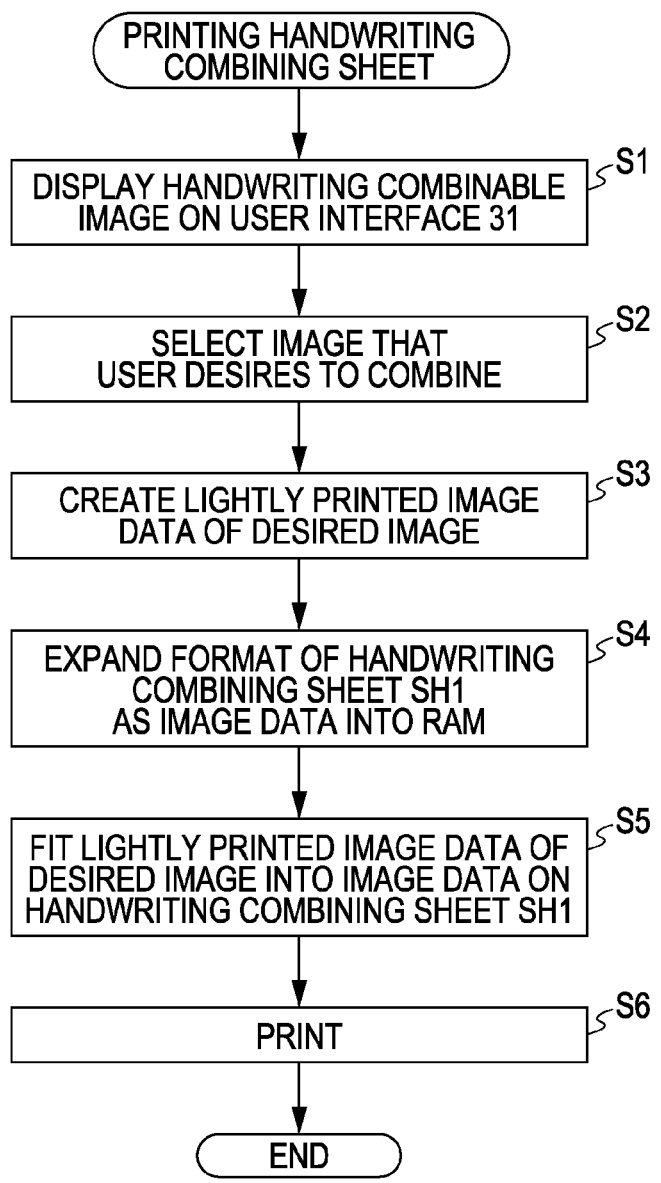

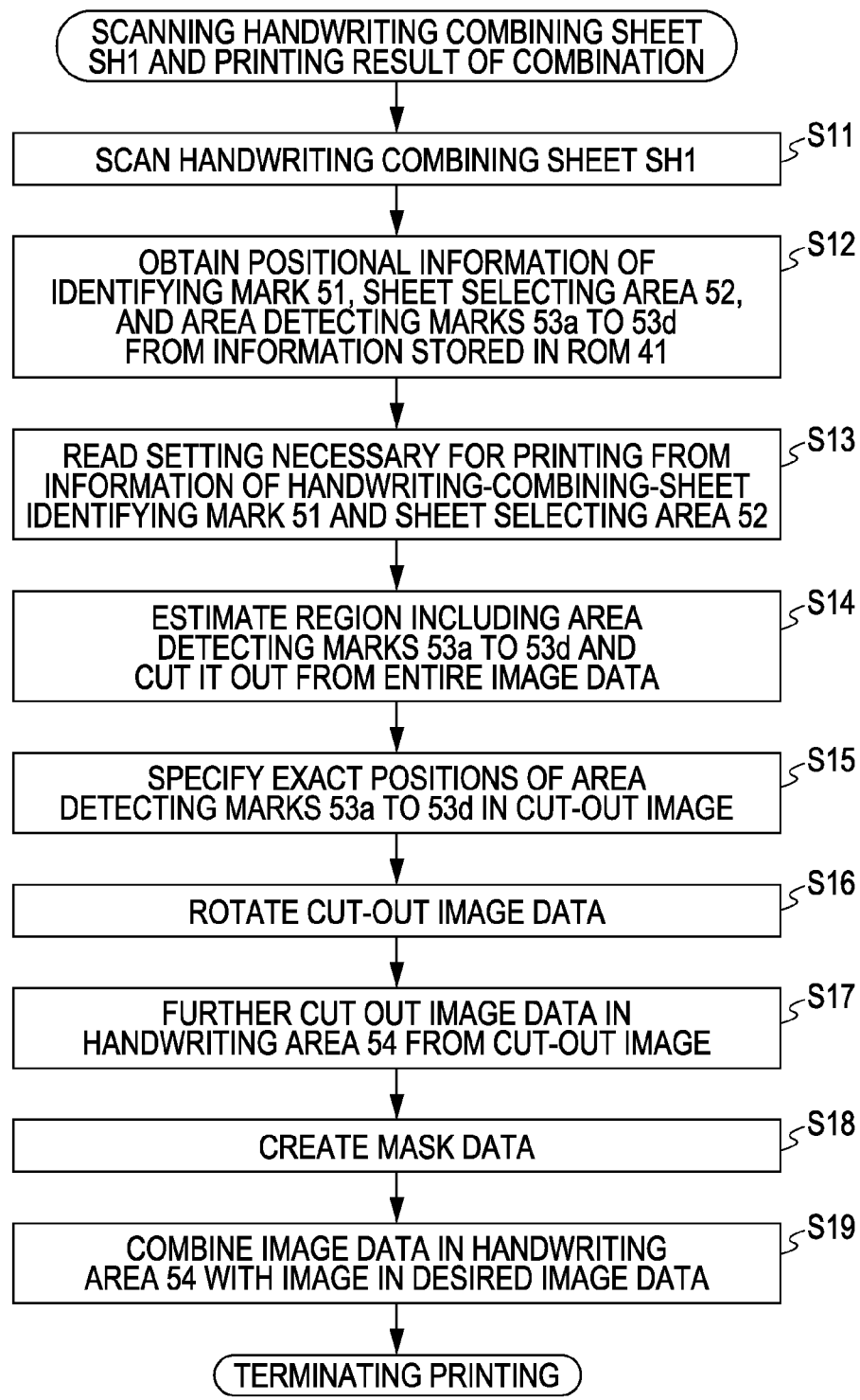

FIG. 10

DISTANCE FROM P1 TO P2: Length
DISTANCE FROM P1 TO P3: Width $$\text{Length} = \sqrt{(x2-x1)^2+(y2-y1)^2} \qquad \text{Eq. (10a)}$$

$$\text{Width} = \sqrt{(x3-x1)^2+(y3-y1)^2} \qquad \text{Eq. (10b)}$$

COORDINATES Q1
AFTER TRANSFORMATION
$$S1=x1 \ , \ T1=y1 \qquad \text{Eq. (10c)}$$

COORDINATES Q2
AFTER TRANSFORMATION
$$S2=x1 \ , \ T2=y1+\text{Length} \qquad \text{Eq. (10d)}$$

COORDINATES Q3
AFTER TRANSFORMATION
$$S3=x1+\text{Width} \ , \ T3=y1 \qquad \text{Eq. (10e)}$$

COORDINATES Q4
AFTER TRANSFORMATION
$$S4=x1+\text{Width} \ , \ T4=y1+\text{Length} \qquad \text{Eq. (10f)}$$

FIG. 11

$$\begin{bmatrix} S \\ T \\ 1 \end{bmatrix} = \begin{bmatrix} h_1 & h_2 & h_3 \\ h_4 & h_5 & h_6 \\ h_7 & h_8 & 1 \end{bmatrix} \begin{bmatrix} x \\ y \\ 1 \end{bmatrix} \quad \text{Eq. (11a)}$$

$$H = \begin{bmatrix} h_1 & h_2 & h_3 \\ h_4 & h_5 & h_6 \\ h_7 & h_8 & 1 \end{bmatrix} \quad \text{Eq. (11b)}$$

$S_1 = h_1 * x_1 + h_2 * y_1 + h_3 \quad$ Eq. (11c)

$T_1 = h_4 * x_1 + h_5 * y_1 + h_6 \quad$ Eq. (11d)

$1 = h_7 * x_1 + h_8 * y_1 + 1 \quad$ Eq. (11e)

$h_7 * x_1 = -h_8 * y_1 \quad$ Eq. (11f)

$h_7 * x_1 * S_1 = -h_8 * y_1 * S_1 \quad$ Eq. (11g)

$-S_1 = -h_1 * x_1 - h_2 * y_1 - h_3 + h_7 * x_1 * S_1 + h_8 * y_1 * S_1 \quad$ Eq. (11h)

$-T_1 = -h_3 * x_1 - h_4 * y_1 - h_5 + h_7 * x_1 * T_1 + h_8 * y_1 * T_1 \quad$ Eq. (11i)

$$\begin{bmatrix} -x_1 & -y_1 & -1 & 0 & 0 & 0 & S_1x_1 & S_1y_1 \\ 0 & 0 & 0 & -x_1 & -y_1 & -1 & T_1x_1 & T_1y_1 \\ -x_2 & -y_2 & -1 & 0 & 0 & 0 & S_2x_2 & S_2y_2 \\ 0 & 0 & 0 & -x_2 & -y_2 & -1 & T_2x_2 & T_2y_2 \\ -x_3 & -y_3 & -1 & 0 & 0 & 0 & S_3x_3 & S_3y_3 \\ 0 & 0 & 0 & -x_3 & -y_3 & -1 & T_3x_3 & T_3y_3 \\ -x_4 & -y_4 & -1 & 0 & 0 & 0 & S_4x_4 & S_4y_4 \\ 0 & 0 & 0 & -x_4 & -y_4 & -1 & T_4x_4 & T_4y_4 \end{bmatrix} * \begin{bmatrix} h_1 \\ h_2 \\ h_3 \\ h_4 \\ h_5 \\ h_6 \\ h_7 \\ h_8 \end{bmatrix} = \begin{bmatrix} -S_1 \\ -T_1 \\ -S_2 \\ -T_2 \\ -S_3 \\ -T_3 \\ -S_4 \\ -T_4 \end{bmatrix} \quad \text{Eq. (11k)}$$

$C * A = R \quad$ Eq. (11l)
WHERE IN Eq. (11l)

$$C = \begin{bmatrix} -x_1 & -y_1 & -1 & 0 & 0 & 0 & S_1x_1 & S_1y_1 \\ 0 & 0 & 0 & -x_1 & -y_1 & -1 & T_1x_1 & T_1y_1 \\ -x_2 & -y_2 & -1 & 0 & 0 & 0 & S_2x_2 & S_2y_2 \\ 0 & 0 & 0 & -x_2 & -y_2 & -1 & T_2x_2 & T_2y_2 \\ -x_3 & -y_3 & -1 & 0 & 0 & 0 & S_3x_3 & S_3y_3 \\ 0 & 0 & 0 & -x_3 & -y_3 & -1 & T_3x_3 & T_3y_3 \\ -x_4 & -y_4 & -1 & 0 & 0 & 0 & S_4x_4 & S_4y_4 \\ 0 & 0 & 0 & -x_4 & -y_4 & -1 & T_4x_4 & T_4y_4 \end{bmatrix} \quad A = \begin{bmatrix} h_1 \\ h_2 \\ h_3 \\ h_4 \\ h_5 \\ h_6 \\ h_7 \\ h_8 \end{bmatrix} \quad R = \begin{bmatrix} -S_1 \\ -T_1 \\ -S_2 \\ -T_2 \\ -S_3 \\ -T_3 \\ -S_4 \\ -T_4 \end{bmatrix}$$

$A = C^{-1}R \quad$ Eq. (11m)

FIG. 14

$$\begin{cases} \begin{bmatrix} S \\ T \\ 1 \end{bmatrix} = \begin{bmatrix} \cos\theta & \sin\theta & x\_shift \\ -\sin\theta & \cos\theta & y\_shift \\ 0 & 0 & 1 \end{bmatrix} \begin{bmatrix} x \\ y \\ 1 \end{bmatrix} \quad \text{Eq. (14a)} \\[2ex] CROSS\_W = \sqrt{(x_4-x_2)^2+(y_4-y_2)^2} \quad \text{Eq. (14b)} \\[2ex] \sin\theta = \dfrac{y_4-y_2}{\sqrt{(x_4-x_2)^2+(y_4-y_2)^2}} \quad \text{Eq. (14c)} \\[2ex] \cos\theta = \dfrac{x_4-x_2}{\sqrt{(x_4-x_2)^2+(y_4-y_2)^2}} \quad \text{Eq. (14d)} \\[2ex] x\_shift = S_4 - x_4\cos\theta - y_4\sin\theta \quad \text{Eq. (14e)} \\[1ex] y\_shift = T_4 + x_4\sin\theta - y_4\cos\theta \quad \text{Eq. (14f)} \end{cases}$$

$$Gray = 0.299 \times R + 0.587 \times G + 0.114 \times B \qquad Eq.\ (18)$$

FIG. 26

$$\sin\theta = \frac{\text{abs}(y_4 - y_2)}{\sqrt{(x_4 - x_2)^2 + (y_4 - y_2)^2}} \quad \text{Eq. (26a)}$$

$$\cos\theta = \frac{\text{abs}(x_4 - x_2)}{\sqrt{(x_4 - x_2)^2 + (y_4 - y_2)^2}} \quad \text{Eq. (26b)}$$

$$x\_shift = S_4 - x_4 \cos\theta - y_4 \sin\theta \quad \text{Eq. (26c)}$$

$$y\_shift = T_4 + x_4 \sin\theta - y_4 \cos\theta \quad \text{Eq. (26d)}$$

FIG. 28
$$S4 = x2 + CROSS\_W \quad \text{Eq. (28a)}$$
$$T4 = y4 \quad \text{Eq. (28b)}$$
$$CROSS\_W = \sqrt{(x_2-x_4)^2 + (y_2-y_4)^2} \quad \text{Eq. (28c)}$$

IMAGE FORMING APPARATUS

BACKGROUND OF THE INVENTION

1. Field of the Invention

The present invention relates to an image forming apparatus having an image scanning apparatus, such as a scanner, a printing unit, such as a printer, and the function of reading a digital image stored in a storage medium, and in particular, to an image forming apparatus that combines a digital image and a user-handwritten image.

2. Description of the Related Art

As described in Japanese Patent Laid-Open No. 2003-80789, an invention to combine a digital image stored in a storage medium and a handwritten image scanned by a scanner and print it is known as one of the functions of multifunction peripherals.

Such an image forming system is configured such that a handwriting combining sheet to which a handwritten image is written is printed, the handwriting combining sheet to which the handwritten image is written is scanned, the handwritten image is extracted from the image on the handwriting combining sheet, and the extracted handwritten image is combined with a digital image. As described in Japanese Patent Laid-Open No. 2007-49620, a method for specifying the position of a handwritten image written on a handwriting combining sheet when scanning the handwriting combining sheet, thereby achieving more accurate combination has been proposed.

However, the foregoing related-art examples have a problem in that if the handwriting combining sheet in an inclined state is placed on a document plate when scanning the handwriting combining sheet, the handwritten image on the handwriting combining sheet is combined in the inclined state. FIG. 1A is a diagram showing a picture image that a user desires to combine. The picture image is the object to be combined. FIG. 1B is a diagram showing the result of combination in the case where the handwriting combining sheet is scanned in a state in which it is not inclined with respect to the document plate. FIG. 1C is a diagrams illustrating a state in which the handwriting combining sheet is placed in an inclined state on a document plate in a related-art example. A handwritten image 55 is characters or pictures written by a user with a writing material, such as a pen. FIG. 1C is a diagram showing the result of composition in the case where the handwriting combining sheet is scanned at an angle with respect to the document plate. In the related-art example, as shown in FIG. 1C, a handwritten image 55b is combined at an angle and out of position with respect to the picture image.

Likewise, when the handwriting combining sheet is placed in reverse, the handwritten image 55 is combined in the reverse state. To prevent it, the portion of the handwriting combining sheet to be located at the abutting portion of the document plate when scanning the handwriting combining sheet is designated. That is, there is the problem of low flexibility in placing the handwriting combining sheet on the document plate.

SUMMARY OF THE INVENTION

The present invention provides an image forming apparatus capable of combining images with little misalignment even if a handwriting combining sheet is placed in an inclined state on a document plate. The invention provides an image forming apparatus including: a printer configured to print an image on a recording sheet; a scanner configured to scan the recording sheet placed on a document plate; a first print control unit configured to make the printer print a first image including a writing region for a user to write on and a mark indicating the writing region onto the recording sheet; a cutting unit configured to cut out an image in a region of a second image that is obtained by scanning the recording sheet, whose writing region is written in, with the scanner, the region including the writing region and a mark image corresponding to the mark included in the second image, on the basis of a position of the mark image in the second image; an extracting unit configured to extract an image in a region showing a content written in the writing region from the image cut out by the cutting unit and rotated in accordance with an orientation of a background image on the basis of the mark image; and a second print control unit configured to make the printer print an image in which the image extracted by the extracting unit is superimposed on the background image.

Further features of the present invention will become apparent from the following description of exemplary embodiments (with reference to the attached drawings).

BRIEF DESCRIPTION OF THE DRAWINGS

FIG. 2 is a block diagram showing an image forming apparatus.

FIG. 4 is a flowchart showing the operation of printing the handwriting combining sheet SH1.

FIG. 6 is a flowchart showing the operation of scanning the handwriting combining sheet SH1.

FIG. 10 is a diagram showing equations of the relationship between the coordinates before and after transformation of cut-out image data.

FIG. 11 is a diagram showing equations in the process of obtaining a matrix necessary for nomography transformation.

FIG. 14 is a diagram showing a method for calculating parameters for rotation using affine transformation.

FIG. 26 is a diagram showing a method for calculating parameters in the case where the image on the handwriting combining sheet SH2 placed in an arbitrary orientation is rotationally corrected by affine transformation.

FIG. 28 is a diagram showing equations for use in calculating the coordinate position in the case where the image on the handwriting combining sheet SH2 placed in an arbitrary orientation is rotationally corrected by affine transformation.

DESCRIPTION OF THE EMBODIMENTS

Figure 1A:
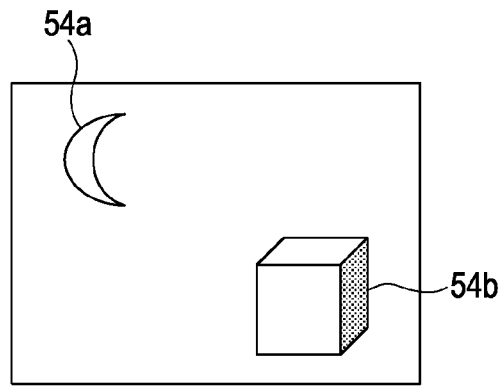
FIG. 1A is a diagram showing a picture image that a user desires to combine.
Figure 1B:
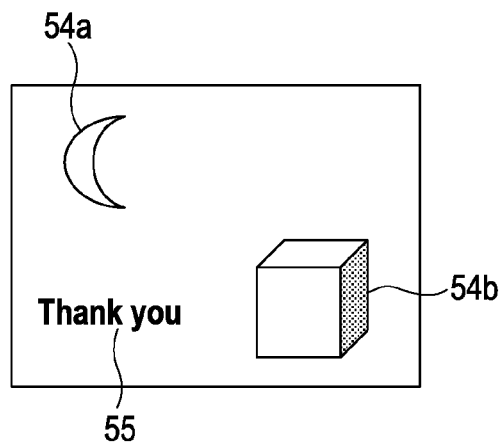
FIG. 1B is a diagram showing the result of combination in the case where the handwriting combining sheet is scanned in a state in which it is not inclined with respect to the document plate.
Figure 1C:
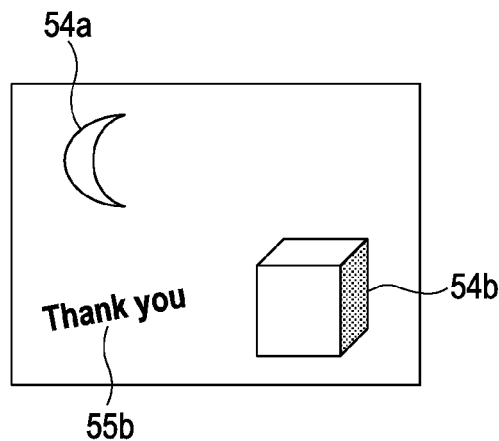
FIG. 1C is a diagrams illustrating a state in which the handwriting combining sheet is placed in an inclined state on a document plate in a related-art example.

FIG. 2 is a block diagram showing an image forming apparatus 100 according to an embodiment of the present invention. The image forming apparatus 100 includes a scanner 10, a printer 20, a manipulating section 30, and a control unit 40. The scanner 10 is constituted of, for example, a CIS or CCD color scanner. The scanner 10 includes a lighting section 11, an image sensor 12, an AD converter 13, a sensor-data control section 14, and a sensor-drive control section 15. The sensor-data control section 14 stores data acquired with the scanner 10 in a RAM 42. The printer 20 is constituted of, for example, an inkjet printer. The inkjet printer forms an image by blowing ink supplied from an ink cartridge (not shown) onto a print sheet. The printer 20 includes a print head 21, a print-drive control section 22, a print-sheet conveying section 23, and a print-data control section 24.

The manipulating section 30 is a section for a user to issue an instruction to the image forming apparatus 100 and includes a user interface 31, a storage-medium control section 32, and a storage medium 33. The user interface 31 is a manipulating section, such as an operation panel configured of, for example, keys or a liquid crystal screen. The storage-medium control section 32 is a section that connects the detachable external storage medium 33, such as an SD card, to the image forming apparatus 100. When image data is present in the connected storage medium 33, the storage-medium control section 32 recognizes it and notifies the control unit 40 of it. The control unit 40 includes a ROM 41, the RAM 42, and a CPU 43. The ROM 41 is a nonvolatile memory in which control programs for the image forming apparatus 100 is stored. The CPU 43 functions as a scanner control unit, a printer control unit, etc. by executing the control programs. In this embodiment, the CPU 43 also functions as a handwriting-sheet printing unit, a handwriting-combining-sheet scanning unit, a combination executing unit, and a combination-result printing unit.

The handwriting-combining-sheet scanning unit is configured such that, when the user requests to create a handwriting combining sheet with the manipulating section, the digital data of the handwriting combining sheet is created using a picture image, and the printer 20 outputs it. The handwriting-combining-sheet scanning unit is configured such that the scanner 10 acquires the digital image data by scanning the handwriting combining sheet, and the handwritten image 55 is extracted from the acquired digital image data. The combination executing unit combines the handwritten image 55 with the picture image and sends the result of combination to the printer 20. The RAM 42 stores temporarily necessary data, such as image data read by the scanner 10 or print data that is converted from a JPEG format file for the printer 20 to print, and deletes them when they become unnecessary.

Figure 3A:
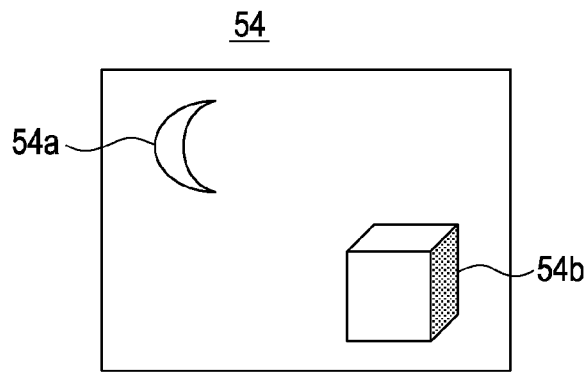
FIGS. 3A and 3B are diagrams showing an example of a handwriting combining sheet SH1 and an example of a handwriting area of the handwriting combining sheet SH1.
Figure 3B:
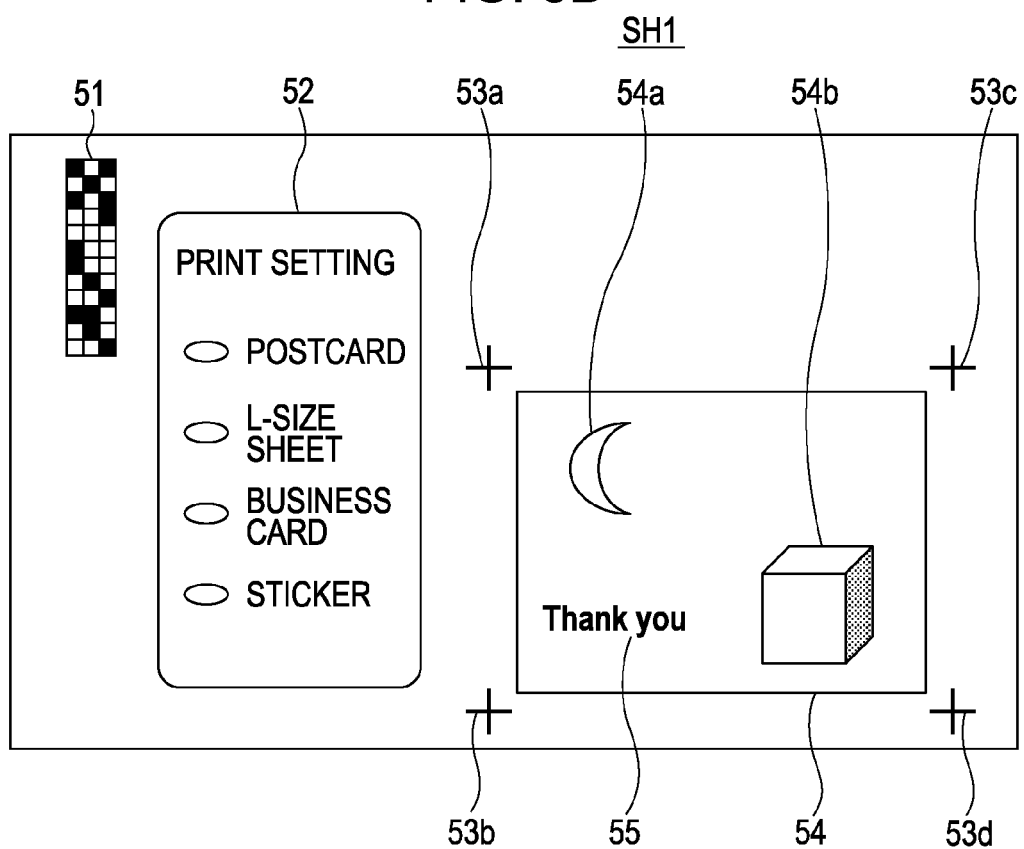

FIGS. 3A and 3B are diagrams showing an example of a handwriting combining sheet SH1 that is used in the embodiment and an example of a handwriting area 54 of the handwriting combining sheet SH1. A handwriting-combining-sheet identifying mark 51 is a mark for use in recognizing that a scanned document is the handwriting combining sheet SH1. The shape of the handwriting-combining-sheet identifying mark 51 changes depending on the handwriting combining sheet SH1 because the handwriting-combining-sheet identifying mark 51 contains information indicating which of images stored in the storage medium 33 is a desired image.

A sheet selecting area 52 is a field provided for the user to select a sheet size for printing after combining the images. Area detecting marks 53a, 53b, 53c, and 53d are position detecting marks for use in properly cutting out the handwriting area 54 when scanning the handwriting combining sheet SH1. In this embodiment, the area detecting marks 53a to 53d are used as inclination detecting marks if the handwriting combining sheet SH1 is inclined with respect to the document plate. The area detecting marks 53a to 53d are also used as marks for obtaining parameters for inclination correction.

The handwriting area 54 is a region to which the user writes the handwritten image 55. The picture image is lightly printed in the handwriting area 54 so that the user can easily see the positional relationship between the handwritten image 55 and the picture image after the combination. Portions 54a and 54b are lightly printed portions of the picture image. The handwritten image 55 is characters that the user added to the printed handwriting combining sheet SH1.

FIG. 4 is a flowchart showing the operation of printing the handwriting combining sheet SH1 according to the embodiment. In the flowchart, "image data" is digital data in which one pixel is expressed by three signals, R, G, and B, and the individual signals have their own value. "binarized image data" is data in which one pixel has a value, 1 or 0; if the value is 1, it indicates black and if the value is 0, it indicates white.

In step S1, the user manipulates the user interface 31 to select execution of printing the handwriting combining sheet SH1. At that time, the CPU 43 operates as the handwriting-combining-sheet scanning unit to create the thumbnail images of picture images stored in the storage medium 33 into the RAM 42 and displays them on the user interface 31. In step S2, the user manipulates the user interface 31 while viewing the displayed picture images to select a desired picture image for combination. In step S3, the CPU 43 reads a picture image file from the storage medium 33 and temporarily stores it in the RAM 42. At that time, the CPU 43 creates the handwriting-combining-sheet identifying mark 51 having information indicating which image in the storage medium 33 is used.

Furthermore, image data for lightly printing the picture image shown in FIG. 3A on the handwriting area 54 of the handwriting combining sheet SH1 is created. First, the top and bottom or the right and left of the picture image are cut off so that the picture image has the same aspect ratio as that of the handwriting area 54. The cut-out image is resized so as to have the same size as the handwriting area 54 in the digital image format of the handwriting combining sheet SH1.

Figure 5:
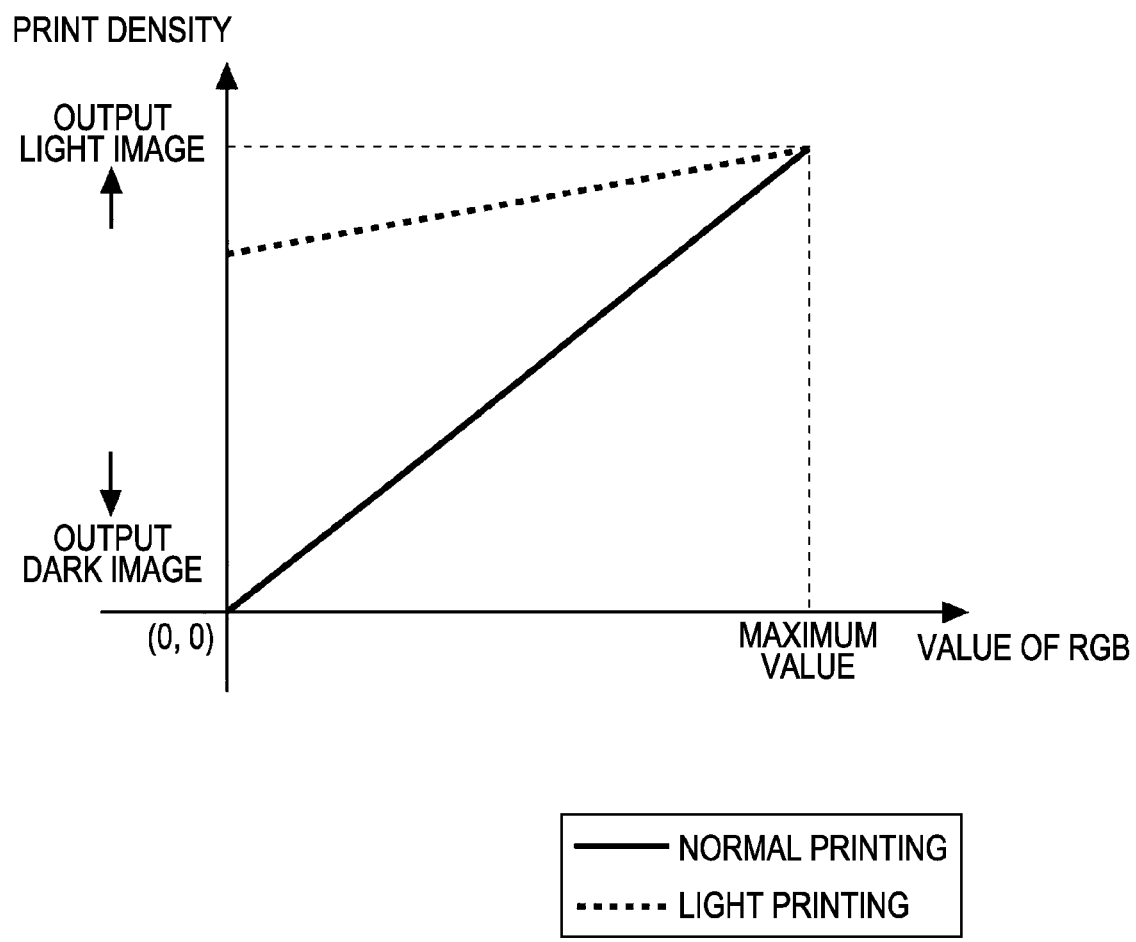
FIG. 5 is a graph showing the input and output relationship when creating a lightly printed image on the handwriting combining sheet SH1.

FIG. 5 is a graph showing the input and output relationship when creating a lightly printed image on the handwriting combining sheet SH1. As shown in FIG. 5, the gray level of the picture image in FIG. 3A is decreased into an image expressed only by a low-density region. The image data created by the foregoing process is referred to as "lightly printed image data". The CPU 43 stores the handwriting-combining-sheet identifying mark 51 created by the above-described method and the lightly printed image data in the RAM 42.

In step S4, the CPU 43 stores the format of the digital image of the handwriting combining sheet SH1, stored in the ROM41, into the RAM 42. In step S5, the CPU 43 fits the lightly printed image data in FIG. 3A into the region of the handwriting area 54 of the handwriting combining sheet SH1 and fits the handwriting-combining-sheet identifying mark 51 into a predetermined position to create the print data of the handwriting combining sheet SH1. In step S6, the CPU 43 makes the printer 20 output the created image data of the handwriting combining sheet SH1.

FIG. 6 is a flowchart showing the operation of scanning the handwriting combining sheet SH1 according to the embodiment. At that time, the CPU 43 functions as the handwriting-combining-sheet scanning unit.

In step S11, the CPU 43 makes the user interface 31 display for the user to read the handwriting combining sheet SH1. The user recognizes it and scans the handwriting combining sheet SH1 to which handwriting is completed with the scanner 10.

Figure 7A:
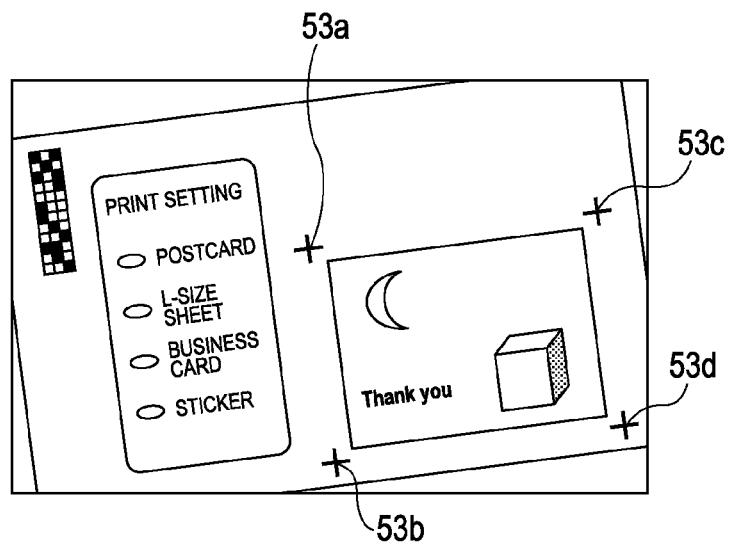
FIG. 7A is a diagram showing an example in which the scanned handwriting combining sheet SH1 is inclined.

FIG. 7A is a diagram showing an example in which the scanned handwriting combining sheet SH1 is inclined.

In step S12, the CPU 43 obtains the positional information of the handwriting-combining-sheet identifying mark 51, the sheet selecting area 52, and the area detecting marks 53a to 53d, stored in the RAM 42. In step S13, the CPU 43 analyzes a region where the handwriting-combining-sheet identifying mark 51 is estimated to be present from the image data of the handwriting combining sheet SH1 on the basis of the positional information of the handwriting-combining-sheet identifying mark 51. The handwriting-combining-sheet identifying mark 51 contains information indicating which of the images in the storage medium 33 is used to create the handwriting combining sheet SH1. On the basis of it, a picture image to be combined is specified, and the image file of the picture image present in the storage medium 33 is stored in the RAM 42.

Figure 7B:
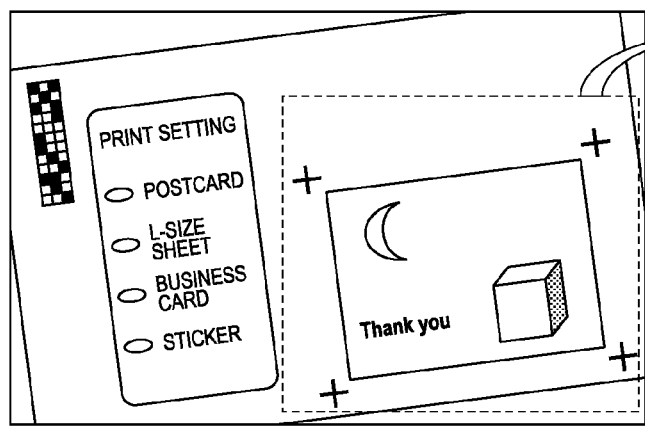
FIG. 7B is a diagrams showing the cutting-out of the inclination correction region in step S14.
Figure 7C:
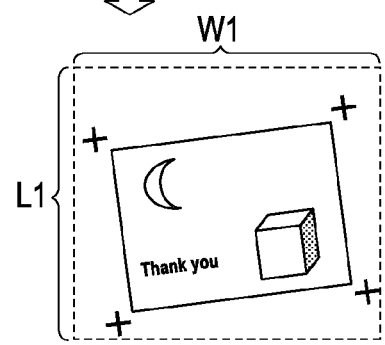
FIG. 7C is a diagrams showing the cutting-out of the inclination correction region in step S14.

At that time, the top and bottom or the right and left of the picture image are cut off so that the picture image has the same aspect ratio as that of the handwriting area 54. The cut-out image is resized to the same size as the handwriting area 54 in the digital image format of the handwriting combining sheet SH1. The image size of the handwriting area 54 can be derived from the resolution when the scanning is executed and the physical size of the handwriting area 54 stored in the ROM 41. FIGS. 7B and 7C are diagrams showing the cutting-out of the inclination correction region in step S14.

In step S14, the CPU 43 cuts out a region that is estimated to include all the area detecting marks 53a to 53d from the image data of the handwriting combining sheet SH1 on the basis of the positional information of the area detecting marks 53a to 53d. The result of cutting-out is a region shown in FIG. 7C.

Figure 8:
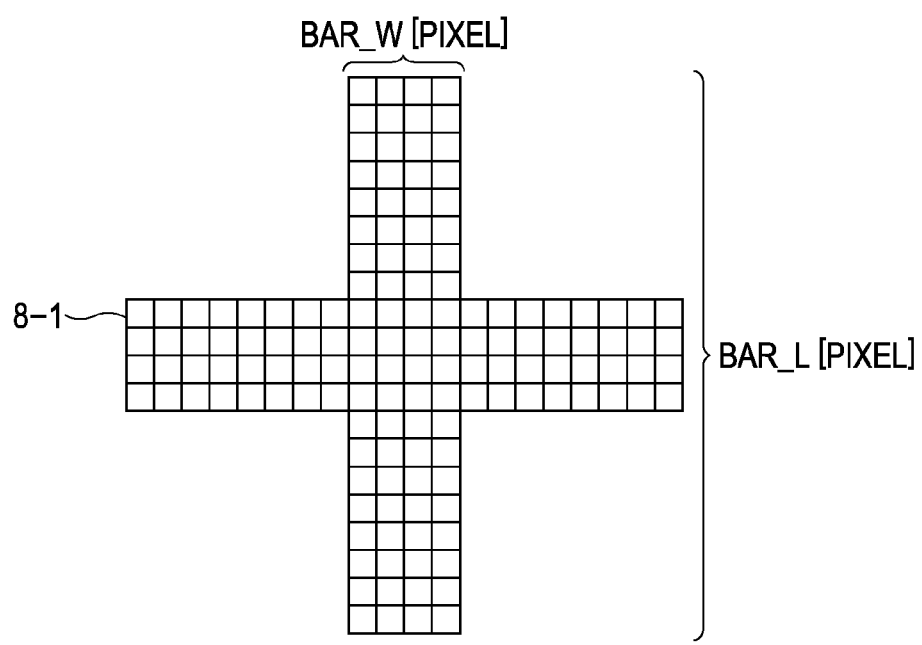
FIG. 8 is a diagram showing an example of the shape of an area detecting mark according to an embodiment.

FIG. 8 is a diagram showing an example of the shape of the area detecting marks 53a to 53d of the embodiment. In this embodiment, all of the area detecting marks 53a to 53d have a shape in which two rectangles with a length of BAR_L [pixel] and a width of BAR_W[pixel] are crossed at the center.

In step S15, the exact positions of the area detecting marks 53a to 53d in the image shown in FIG. 7C are specified by pattern matching.

Details of Inclination Correcting Process (Step S16) Using Inclination Detecting Marks In step S16, the image in FIG. 7C is rotated so that the handwriting area 54 becomes parallel to the image data. In this embodiment, homography transformation is used to rotate the image. The details of the homography transformation will be described below.

Figure 9:
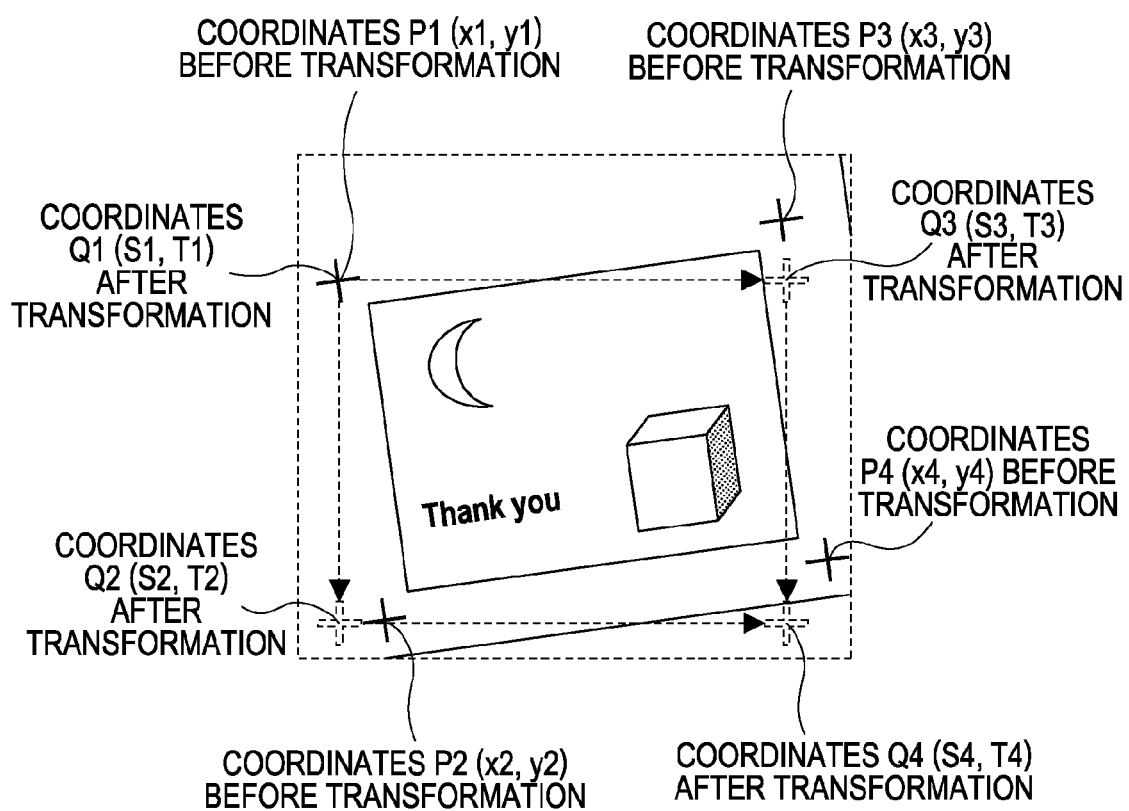
FIG. 9 is a diagram showing the relationship between the actual positions of area detecting marks and the positions of the area detecting marks in a state in which the handwriting area is not inclined with respect to the scanned image in the image subjected to inclination correction processing in this embodiment.

FIG. 9 is a diagram showing the relationship between the actual positions of the area detecting marks 53a to 53d and the positions of the area detecting marks 53a to 53d in a state in which the handwriting area 54 is not inclined with respect to the scanned image in the image subjected to inclination correction processing in this embodiment.

In this embodiment, coordinate positions P before transformation are the coordinate positions of the actual detecting marks in FIG. 9. Coordinate positions Q after transformation are the coordinate positions of the detecting marks with no inclination. Of the coordinate positions P before transformation, let the coordinates P1 of the area detecting mark 53a before transformation, at the upper left of the image data shown in FIG. 7A, be (x1, y1); let the coordinates P2 of the area detecting mark 53b before transformation, at the lower left of the image data shown in FIG. 7A, be (x2, y2); let the coordinates P3 of the area detecting mark 53c before transformation, at the upper right of the image data shown in FIG. 7A, be (x3, y3); and the coordinates P4 of the area detecting mark 53d before transformation, at the lower right of the image data shown in FIG. 7A, be (x4, y4).

Of the coordinate positions Q after transformation, let the coordinates Q1 of the area detecting mark 53a after transformation, at the upper left of the image data shown in FIG. 7C, be (S1, T1). In the same manner, let the coordinates Q2 of the area detecting mark 53b after transformation at the lower left be (S2, T2); let the coordinates Q3 of the area detecting mark 53c after transformation at the upper right be (S3, T3); and let the coordinates Q4 of the area detecting mark 53d after transformation at the lower right be (S4, T4).

FIG. 10 is a diagram showing equations of the relationship between the coordinates before and after transformation of cut-out image data. Eq. (10a) shown in FIG. 10 is an equation for obtaining the length of the short side of a rectangle formed by the area detecting marks 53a to 53d in the embodiment. Eq. (10b) shown in FIG. 10 is an equation for obtaining the length of the rectangle formed by the area detecting marks 53a to 53d in the embodiment. Of the coordinate positions P before transformation, the position of the area detecting mark 53a at the upper left is set as "reference coordinates" that do not change in position before and after transformation. That is, in this embodiment, the coordinates P1 of the area detecting mark 53a is the coordinates Q1. Eq. (10c) shown in FIG. 10 is an equation that expresses the relationship between the coordinates Q1 and P1 in the embodiment.

The CPU 43 obtains the coordinate positions of the area detecting marks 53a to 53d after transformation so that the short sides of the rectangle that is drawn when all the area detecting marks 53 are connected with lines become perpendicular to the image data, and the long sides of the rectangle becomes parallel to the image data. Since the coordinates Q2 are located at a position advancing from the coordinates Q1 in parallel to the y-axis, the value on the x-axis of the coordinates Q2 is the same as the value on the x-axis of the coordinates Q1. The value on the y-axis of the coordinates Q2 is a value obtained by moving the value T1 on the y-axis of the coordinates Q1 by the distance (length) between P1 and P2. Thus, Eq. (10d) can be obtained. Likewise, coordinates Q3 are at a position advancing from the coordinates Q1 in parallel to the x-axis; therefore, the value on the y-axis of the coordinates Q3 is equal to the value on the y-axis of the coordinates Q1, and the value on the x-axis of the coordinates Q3 is a value obtained by moving the value S1 on the x-axis of the coordinates Q1 by the distance (width) between P1 and P3. Thus, Eq. (10e) can be obtained. The value on the x-axis of the coordinates Q4 is equal to the value on the x-axis of the coordinates Q3. The value on the y-axis of the coordinates Q4 is equal to the value on the y-axis of the coordinates Q2. Thus, Eq. (10f) can be obtained.

FIG. 11 is a diagram showing equations in the process of obtaining a matrix necessary for nomography transformation. Here, a matrix H that satisfies Eq. (11a) is present between the (S, T) coordinate system and the (x, y) coordinate system. That is, by obtaining the matrix H shown by Eq. (11b) and multiplying individual points of the (x, y) coordinate system by the matrix H, it can be transformed to the (S, T) coordinate system. In this embodiment, the CPU 43 obtains the matrix H as follows.

First, the coordinates P1 before transformation and the coordinates Q1 after transformation are substituted into Eq. (11a). The resultant equations are Eq. (11c), Eq. (11d), and Eq. (11e). These three equations are combined into one equation. In Eq. (11e), if 1 is subtracted from both sides and the term of x1 is moved to the left side, then Eq. (11f) is obtained. Furthermore, the both sides are multiplied by S1 to obtain Eq. (11g).

On the other hand, both sides of Eq. (11c) are multiplied by −(minus) to obtain Eq. (11h). If both sides of Eq. (11g) are added to the right side of Eq. (11h), then Eq. (11i) can be obtained because the absolute values of both sides of Eq. (11g) are equal and the signs thereof are different. Eq. (11d) is transformed, as in the above, to obtain Eq. (11j).

Equations in the same form as those are applied also to the equations of the coordinates P2 to P4 before transformation and the equations of the coordinates Q2 to Q4 after transformation and combined into a matrix is Eq. (11l). An equation that simply describes this relationship is Eq. (11k). If an inverse matrix C is obtained from the equation and R is multiplied by it, a matrix A can be obtained. Known solutions of the inverse matrix include a sweeping-out method. Since the matrix A is a matrix in which the elements of the matrix H are rearranged, the matrix H can be derived by obtaining the matrix A.

When the matrix H can be obtained, Eq. (11a) is executed for all the pixels that constitute the cut-out image to rotate the image. However, the homography transformation is nonlinear transformation. Therefore, if the rotation is executed by this method, the relationship between the coordinates after transformation and the coordinates before transformation does not always become a one-to-one relationship. Accordingly, it is necessary to complement the data of nonexistent coordinate positions of the coordinate system after transformation. Examples of the method include a nearest-neighbor interpolation method and a bilinear interpolation method.

Figure 12:
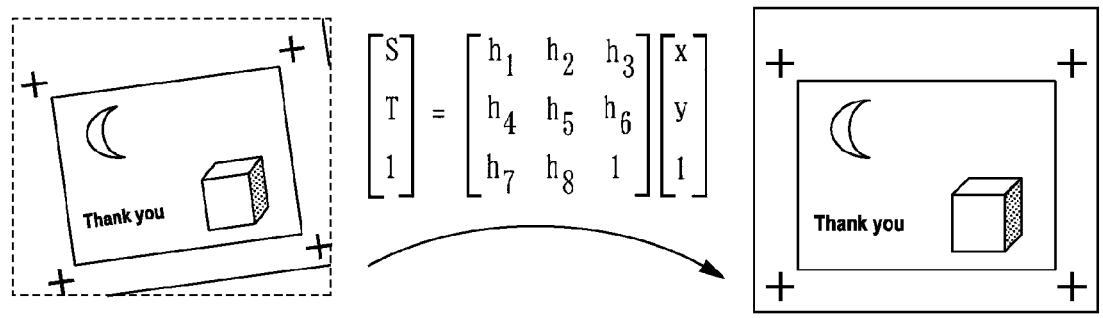
FIG. 12 is a schematic diagram showing states before and after inclination correction.
Figure 13:
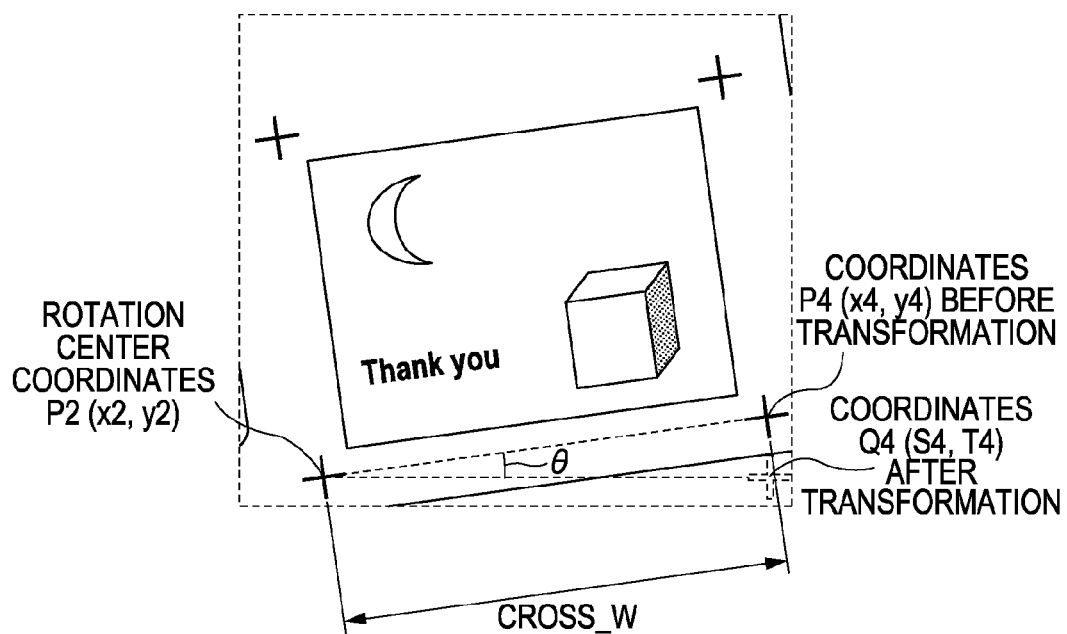
FIG. 13 is a diagram showing the center of rotation and a rotation angle θ.

FIGS. 12 and 13 are schematic diagrams showing states before and after execution of the inclination correction in the embodiment. The individual coordinates of the original image are multiplied by the matrix H to into a new coordinate system.

Details 2 of Inclination Correction Process (S16) Using Inclination Area Detecting Marks 53a to 53d In step S16, affine transformation may be used instead of the above-described nomography transformation. For example, in correcting the inclination of the document using affine transformation, there is a method for rotating the entire image by θ° about one point in the area detecting marks 53a to 53d. Specifically, a method for rotating the entire image is possible in which the angle formed by the detecting mark 53b as the vertex, the area detecting mark 53d at the lower right, and the ideal position of the detecting mark 53d is used as its rotation angle θ.

FIG. 14 is a diagram showing a method for calculating parameters for rotation using affine transformation. The ideal coordinates Q4 (S4, T4) of the area detecting mark 53d at the lower right can be given by Eq. (10f). For the actual coordinates (x, y) and the ideal coordinates (S, T), Eq. (14a) holds. In Eq. (14a), cos [theta] and sin [theta] can be given by Eq. (14d) and Eq. (14c) based on CROSS W shown by Eq. (14b), respectively, depending on the positional relationship in the image data. After cos [theta] and sin [theta] have been obtained, x_shift and y_shift can be obtained by substituting the coordinates P4 of the area detecting mark 53d before transformation and the coordinates Q4 of the area detecting mark 53d after transformation into Eq. (14e) and Eq. (140, respectively.

Since all the parameters can be obtained in this way, Eq. (14a) is executed for the coordinates of the entire image to obtain (S, T) of the individual coordinates, thereby performing rotation. Since affine transformation uses a trigonometric function for the derivation, the results of calculation of the coordinates after transformation are of a real number type. However, the coordinates of digital image data are of a positive number type. Therefore, the fractional portions of the real numbers of the calculation are rounded off, so that the coordinates before transformation and the coordinates after transformation sometimes have not a one-to-one relationship. Accordingly, as in the homography transformation, data of nonexistent coordinate positions needs to be interpolated. Examples of this method include a nearest-neighbor interpolation method and a bilinear interpolation method.

Figure 15A:
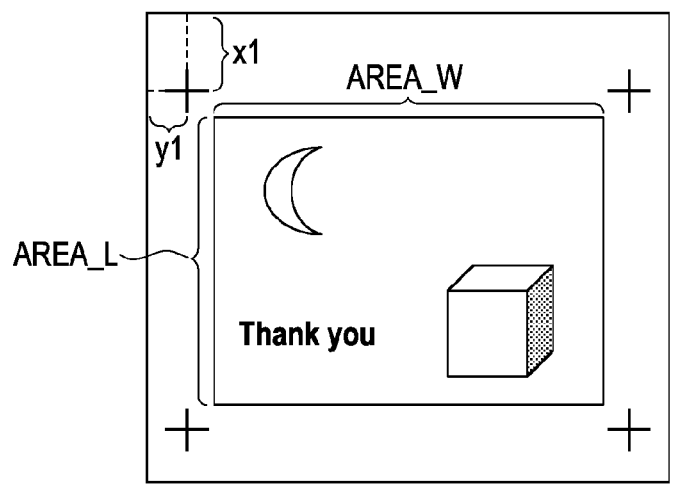
FIG. 15A is a general view showing the positional relationship between the area detecting marks and the handwriting area.
Figure 15B:
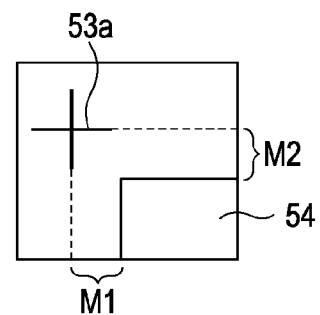
FIG. 15B is a diagram showing the positional relationship between one area detecting mark and the handwriting area in FIG. 15A.

FIG. 15A is a general view showing the positional relationship between the area detecting marks 53 and the handwriting area 54. FIG. 15B is a diagram showing the positional relationship between one area detecting mark 53a and the handwriting area 54 in FIG. 15A.

In step S17, after the inclination correction has been completed, a rectangle with a width of AREA_W and a length of AREA_L is cut out with a position (x1+M1, y1+M2) that is obtained by adding distances M1 and M2 in FIG. 15B to the coordinates Q1 of the area detecting mark 53a as the starting point.

Figure 16:
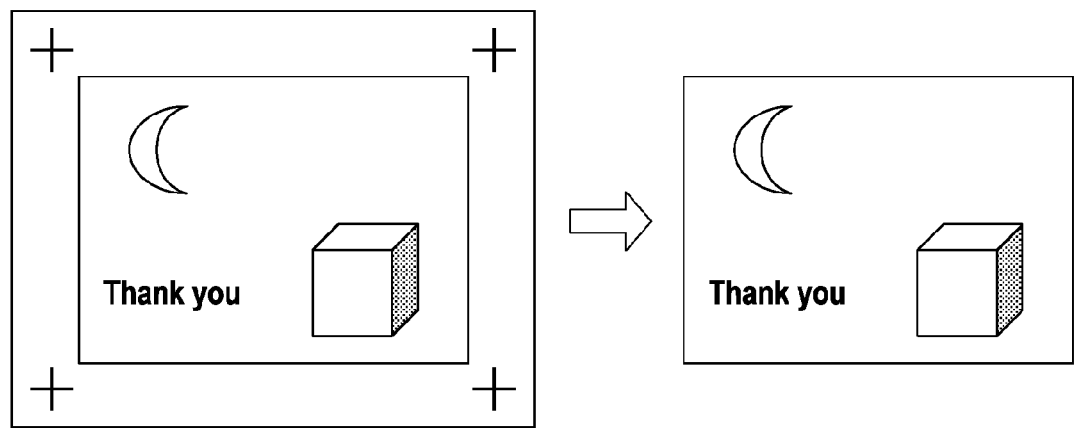
FIG. 16 is a diagram schematically showing the cut-out rectangle with a width of AREA_W and a length of AREA_L.

FIG. 16 is a diagram schematically showing the cut-out rectangle with a width of AREA_W and a length of AREA_L. This image is handled as an image in the handwriting area 54.

In step S18, mask data for combining the picture in the image data of the handwriting area 54 obtained by the procedure to step S17 with only the handwritten image 55 is created. In creating the mask data, the difference in brightness between the lightly printed portions 54a and 54b of the picture image and the handwritten image 55 is used.

Figure 17A:
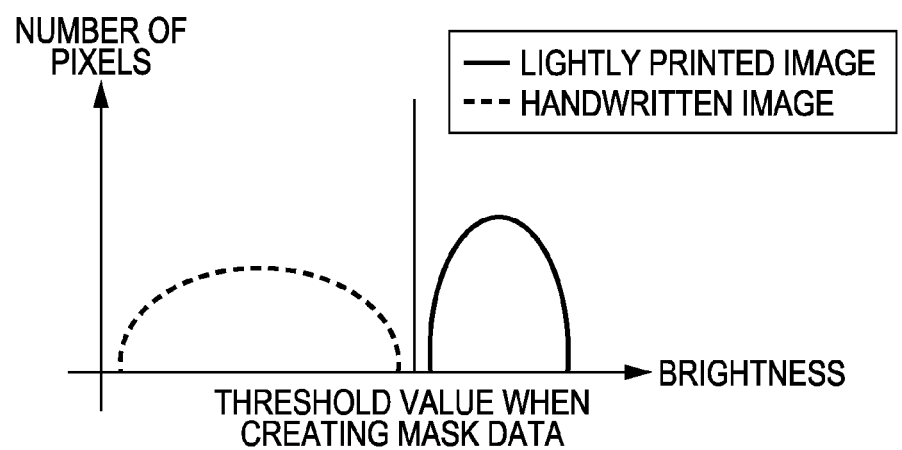
FIG. 17A is a brightness histogram of the lightly printed image, which is part of the picture image, and the handwritten image.

FIG. 17A is a brightness histogram of the lightly printed image, which is part of the picture image, and the handwritten image 55. The lightly printed image is printed at a low-density-side low gray level in step S3 in FIG. 4. Accordingly, when this is scanned into digital data, its brightness histogram is distributed at the higher brightness side, as shown in FIG. 17A. On the other hand, the brightness histogram of the handwritten image 55 is estimated to be distributed to the lower brightness side.

Figure 17B:
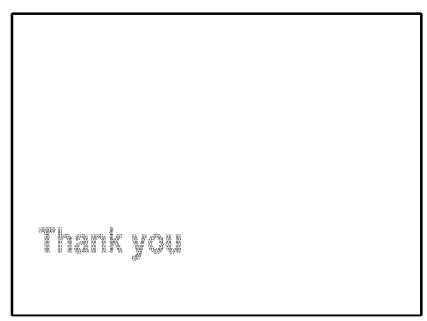
FIG. 17B is a schematic diagram of mask data created from the cut-out region.

Thus, the data of the handwriting area 54 is binarized using a threshold that is determined so that its brightness does not become higher than the lowest brightness of the lightly printed image. Specifically, it is performed as follows. First, binarized image data having the same length and width as those of the handwriting area 54 is prepared in the RAM 42. The elements of this arrangement have only a value, 1 or 0, and all the initial values are 0. For the pixels of the handwriting area 54, the value of brightness, Gray, is derived from Eq. (18); if the value is greater than or equal to the threshold value, the bit of an element at the same location in the mask data is changed. This process is performed for all the pixels in the handwriting area 54. The binarized image data thus obtained is stored in the RAM 42 and is used as mask data. FIG. 17B is a schematic diagram of the mask data created from the cut-out region, of which the portion described in "Thank you" is a portion where the mask bits are set.

Figures 18, 19:
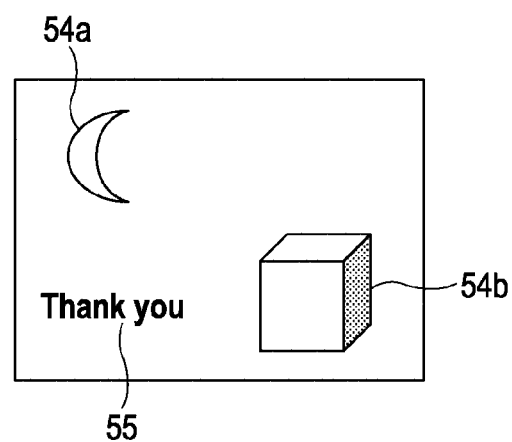
FIG. 18 is a diagram showing Eq. (18) for obtaining the value of Gray from the values of R, G, and B.
FIG. 19 is a diagram showing the result of combination after inclination correction.

FIG. 18 is a diagram showing Eq. (18) for obtaining the value of Gray from the values of R, G, and B in this embodiment.

Examples of an equation used for determining mask data may be one using a brightness value, like Eq. (18), and one using a color density and a method using some filter. Furthermore, a method in which those results are combined may also be employed.

In step S19, a composite image is formed using the mask data obtained as in the above, the image data in the handwriting area 54, and the picture image shown in FIG. 3A. First, for the individual pixels of desired image data which is transformed to the same image size as the handwriting area 54 and stored in the RAM, the elements of mask data present in the positions corresponding to the pixels are referred to. When the elements of the mask data are at 0, no processing is performed for the data of the picture image. If the elements of the mask data are at 1, the pixels of the picture image data at the same location as the mask data are overwritten by the pixels of the handwriting area 54 at the same locations in the image data.

FIG. 19 is a diagram showing the result of combination after the inclination correction is executed in the embodiment. As has been described, the image processing of the embodiment allows the handwritten image 55 obtained from the image on the handwriting combining sheet SH1 scanned in an inclined state and the portions 54a and 54b of the picture image to be combined in the same orientation. Furthermore, not the entire scanned sheet but a partial region including the area detecting marks is rotated, which offers the advantage of reducing a processing load more than when rotating the entire image.

Next, another embodiment different from the above-described embodiment will be described.

In the handwriting combining sheet SH1 shown in the above embodiment, the handwriting-combining-sheet identifying mark 51 has only one-dimensional information. Accordingly, if the handwriting combining sheet SH1 is rotated 180° from the original orientation with respect to the document plate, it cannot be determined whether the user placed it by mistake or a sheet having the handwriting-combining-sheet identifying mark 51 with an inverse configuration is placed. That is, there is a problem in that it cannot be determined in which orientation the extracted handwritten image should be combined.

Thus, an embodiment in which a relative position mark 62 is added to the handwriting combining sheet SH1 will be described. This allows even the handwriting combining sheet placed on the document plate in an orientation different from the proper position to be recognized and allows the orientation of the combination of the handwritten image to be determined. Since the apparatus configuration and the method for printing the handwriting combining sheet are the same as those of the above-described embodiment using the handwriting combining sheet SH1, detailed descriptions thereof will be omitted.

Figure 20:
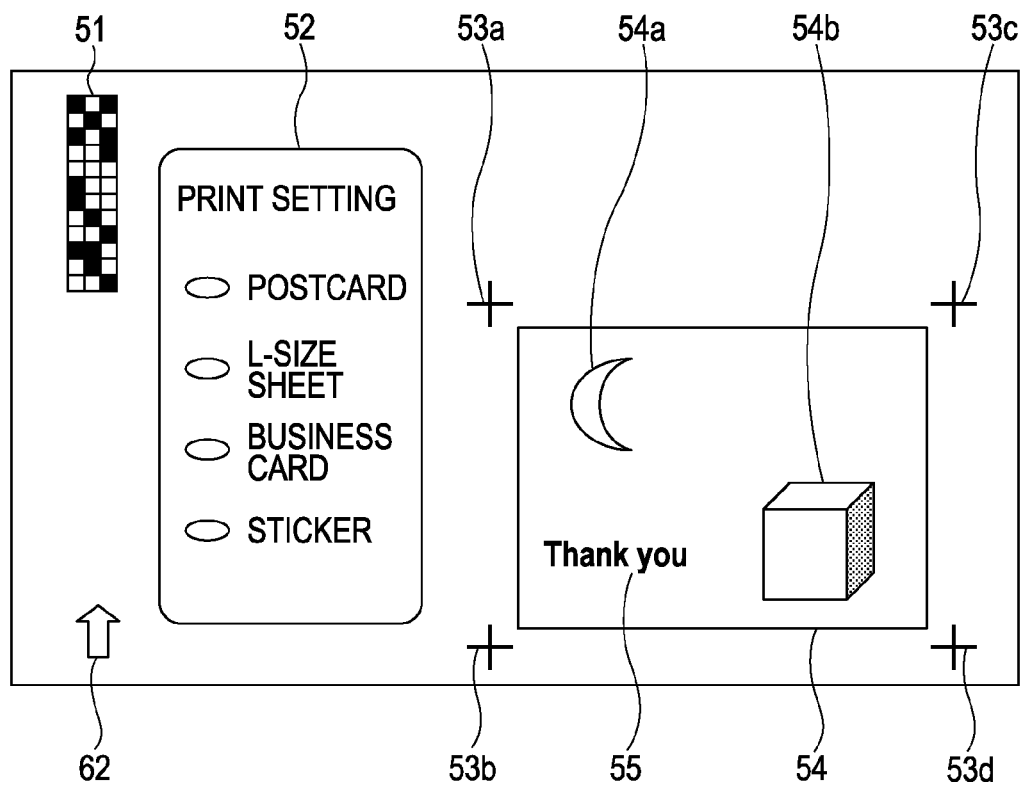
FIG. 20 is a diagram showing a handwriting combining sheet SH2.

FIG. 20 is a diagram showing a handwriting combining sheet SH2.

The handwriting combining sheet SH2 is a sheet in which the relative position mark 62 is added to the handwriting combining sheet SH1. The relative position mark 62 is a mark for finding the relative positions of the area detecting marks 53 in the handwriting combining sheet SH2.

Figure 21:
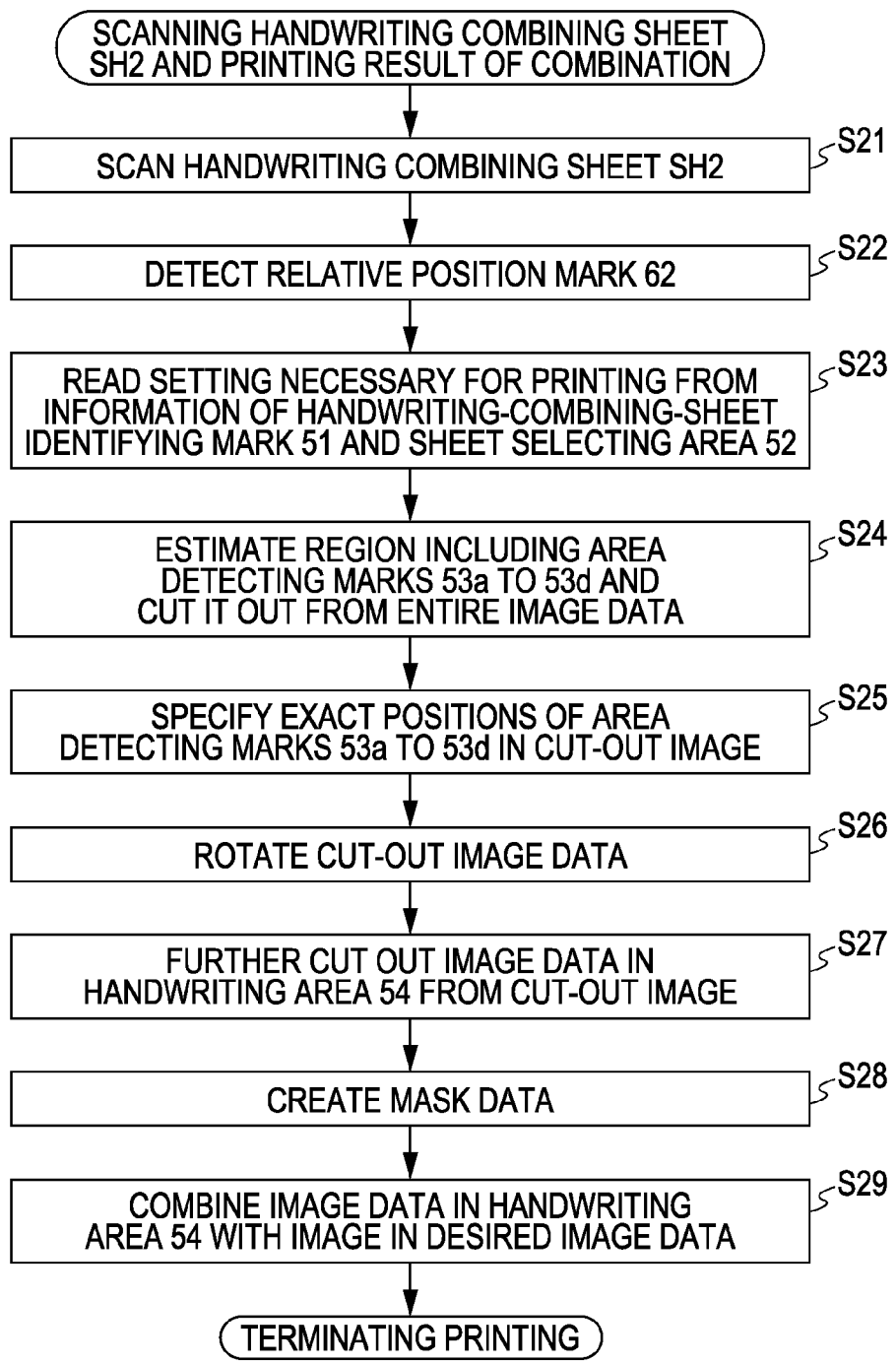
FIG. 21 is a flowchart showing the operation of rotating the handwriting area using a relative position mark.

FIG. 21 is a flowchart showing the operation of rotating the handwriting area 54 using the relative position mark 62. The CPU 43 functions as the handwriting-combining-sheet scanning unit. In step S21, the CPU 43 makes the user interface 31 display for the user to read the handwriting combining sheet SH2. The user recognizes the display and scans the handwriting combining sheet SH2 to which handwriting is completed with the scanner 10.

Figure 22A:
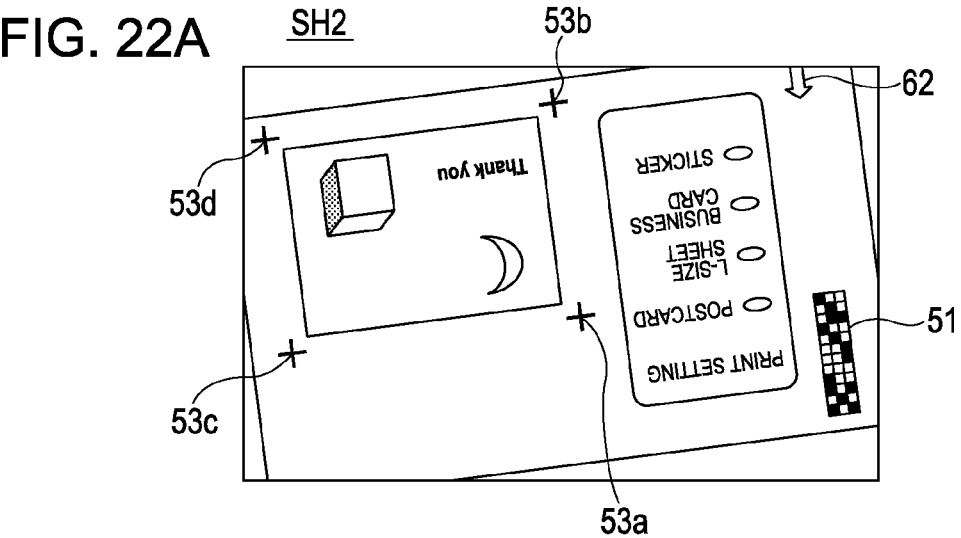
FIG. 22A is a diagram showing an image when the handwriting combining sheet SH2 is scanned in an orientation different from the proper orientation with respect to an abutting position.
Figure 23:
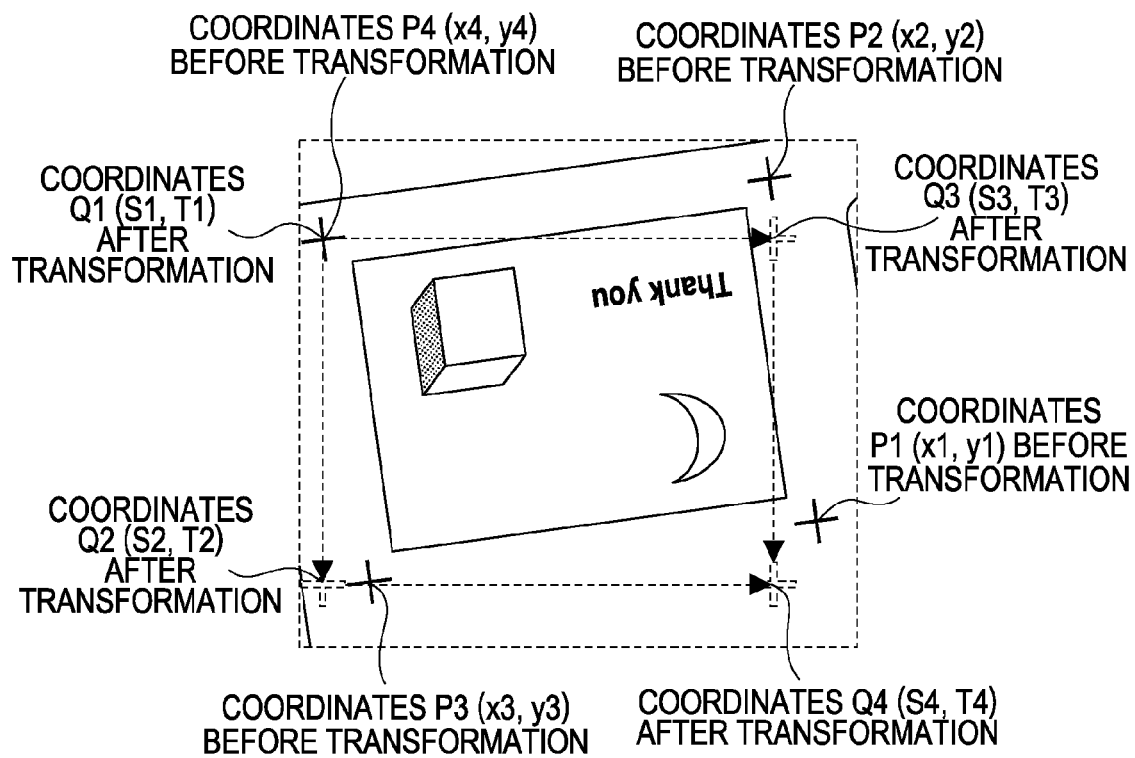
FIG. 23 is a diagram showing the positional relationship between the coordinates before and after transformation in the case where the image on the handwriting combining sheet SH2 placed in an arbitrary orientation is rotationally corrected by homography transformation.

FIG. 22A is a diagram showing an image when the handwriting combining sheet SH2 is scanned in an orientation different from the proper orientation with respect to an abutting position. FIG. 23 is a diagram showing the positional relationship between the coordinates before and after transformation in the case where the image on the handwriting combining sheet SH2 placed in an arbitrary orientation is rotationally corrected by nomography transformation.

In step S22, the CPU 43 detects an image having the same pattern as the relative position mark 62 from the thus-obtained image data of the handwriting combining sheet SH2. For the detection, an exiting pattern matching technology is used. In step S23, the CPU 43 relatively estimates a position where the handwriting-combining-sheet identifying mark 51 is present from the position of the relative position mark 62 and analyzes the estimated region. The handwriting-combining-sheet identifying mark 51 has information indicating which image of the images stored in the storage medium 33 is used when creating the handwriting combining sheet SH2. On the basis of this information, a picture image to be combined is specified, and the image file of the picture image present in the storage medium 33 is stored in the RAM 42. At that time, it is resized to a size having the same number of vertical and lateral pixels of the image data of the handwriting area 54. The size of the image of the handwriting area 54 is derived from the resolution when the scanning is executed and the physical size of the handwriting area 54 stored in the ROM 41.

Furthermore, the region where the sheet selecting area 52 is present is estimated from the position of the relative position mark 62. It is determined what in the sheet selecting area 52 is checked for the estimated region using a technology such as OCR, and print conditions for the determined sheet selecting area 52 are set.

In step S24, the CPU 43 roughly estimates a portion that may include all the area detecting marks 53a to 53d on the basis of the position and orientation of the relative position mark 62.

Figure 22B:
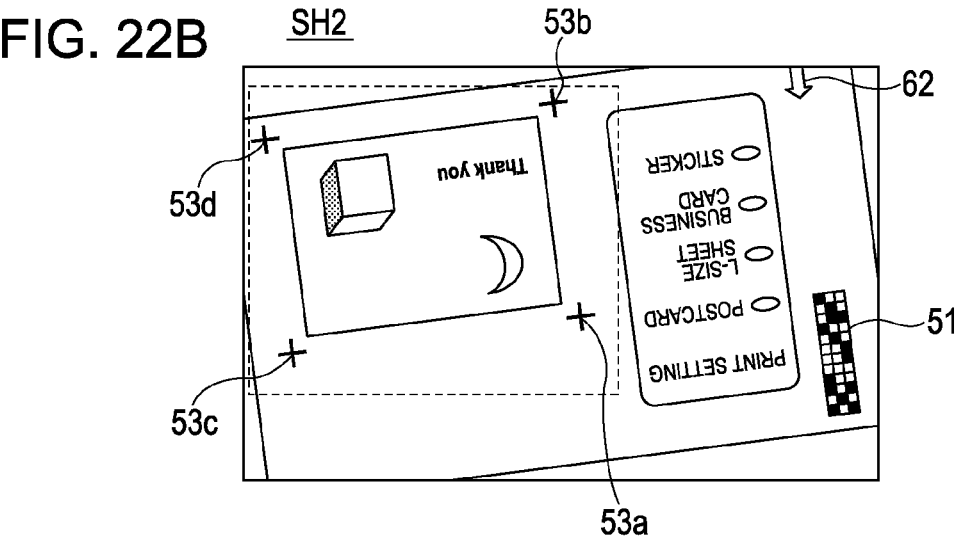
FIG. 22B is a diagram showing the process of cutting out a region estimated to include all the area detecting marks.
Figure 22C:
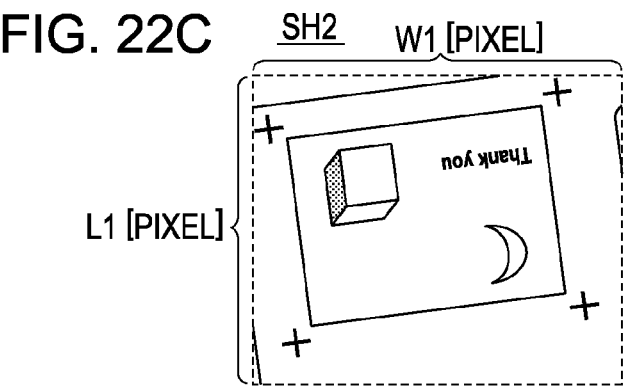
FIG. 22C is a diagram showing the process of cutting out the region estimated to include all the area detecting marks.

FIGS. 22B and 22C are diagrams showing the process of cutting out a region that is estimated to include all the area detecting marks 53a to 53d. For the estimated region, the CPU 43 cuts out an area with a width of W1[pixel] and a length of L1[pixel]. Then, the image shown in FIG. 22C is cut out by the CPU 43.

In step S25, the CPU 43 detects the exact positional coordinates of all the area detecting marks 53a to 53d from the cut-out data. This procedure is the same as that in the above-described step S15. In step S26, the cut-out image is rotated. For the homography transformation, the following rules are set up for the way of setting the coordinates P1 to P4 of the area detecting marks 53 before transformation and the coordinates Q1 to Q4 of the area detecting marks 53 after transformation.

First, before transformation, let the coordinates of an area detecting mark located at the area detecting mark 53a in FIG. 22A be P1 with respect to the relative position mark 62. Let the coordinates of the area detecting mark 53 nearest to the coordinates P1 be coordinates P2. Let the coordinates of the area detecting mark 53 the second nearest to the coordinates P1 be P3. Let the coordinates of the farthest area detecting mark 53 be P4.

Next, after transformation, any cut-out image is handled as an image with a long side (Width) and a short side (Length). In the cut-out image, let the coordinates of the area detecting mark 53 nearest to the upper left corner be a reference coordinates Q1. Let a point that passes the reference coordinates Q1 and in which the distance from the reference coordinates Q1 on the straight line extending parallel to the short side of the image is equal to the distance between P1 and P2 be coordinates Q2.

Let a point that passes the reference coordinates Q1 and in which the distance from the reference coordinates Q1 on the straight line parallel to the long side of the image is equal to the distance between P1 and P3 be coordinates Q3. Let the intersection of a line passing through the coordinates Q2 and extending parallel to the long side and a line passing through the coordinates Q3 and extending in parallel to the short side be coordinates Q4. The coordinates of the area detecting marks 53a to 53d after transformation are obtained according to the above rules. Next, the lengths and widths of the sides are calculated using Eq. (10a) and Eq. (10b).

Figure 24:
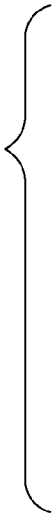
FIG. 24 is a diagram showing the relationship between the coordinates before and after transformation.

FIG. 24 is a diagram showing the relationship between the coordinates before and after transformation. The coordinates of the area detecting marks 53a to 53d after transformation are given by Eq. (24a) to Eq. (24d). The results are substituted into Eq. (11e), and the elements of the matrix A are obtained, thereby deriving the matrix H. The matrix A can be given by Eq. (11m) by multiplying the matrix R by the inverse matrix of the matrix C. The matrix H obtained here is a matrix for rotating the image data in FIG. 22B by 180° and for transforming the coordinates of the handwriting area 54 so that it becomes parallel to the image data. The obtained matrix H is substituted into the coordinates of the pixels in FIG. 22B, and Eq. (11a) is calculated, thereby obtaining the coordinates after transformation.

In step S26, the image may be rotated using affine transformation. First, it is determined which of the area detecting marks 53a to 53d is used as the center of rotation. In this example, the image is rotated about an area detecting mark nearest to the relative position mark 62. Accordingly, for the cut-out image shown in FIG. 22C, the area detecting mark 53b is the center of rotation. Next, the angle of rotation is determined. In the example shown in FIG. 22A, the angle formed by the straight line passing through the area detecting mark 53b and the area detecting mark 53d and the long side of the image is used as the rotation angle.

Figure 25:
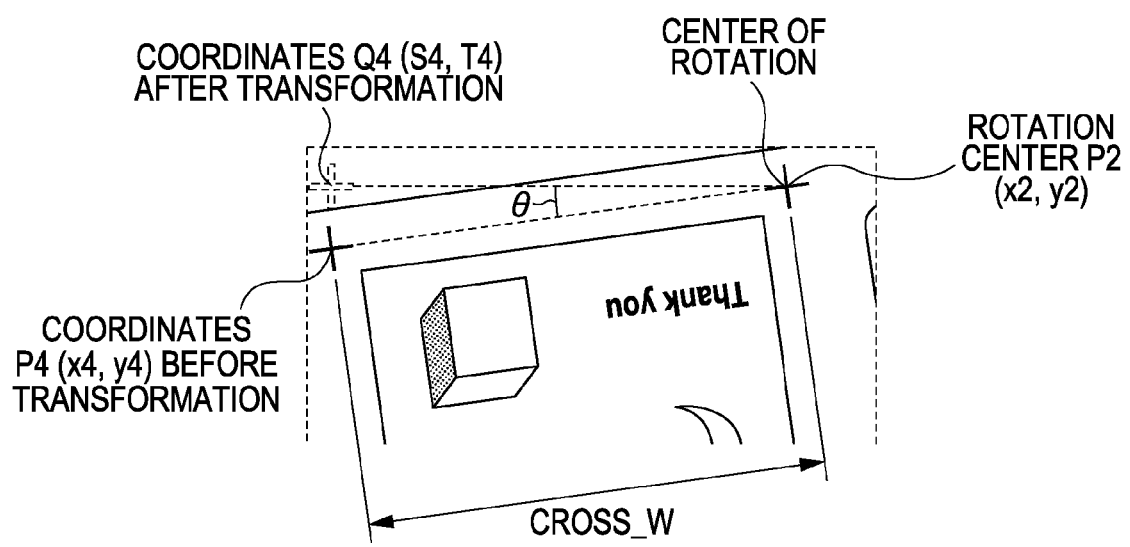
FIG. 25 is a diagram showing the positional relationship between the coordinates before and after transformation in the case where the image on the handwriting combining sheet SH2 placed in an arbitrary orientation is rotationally corrected by affine transformation.

FIG. 25 is a diagram showing the positional relationship between the coordinates before and after transformation in the case where the image on the handwriting combining sheet SH2 placed in an arbitrary orientation is when rotationally corrected by affine transformation. FIG. 26 is a diagram showing a method for calculating parameters in the case where the image on the handwriting combining sheet SH2 placed in an arbitrary orientation is rotationally corrected by affine transformation.

Next, $\sin\theta$ and $\cos\theta$ are obtained using Eq. (26a) and Eq. (26b). Furthermore, it is determined whether values to be substituted into Eq. (14a) are positive or negative. It is determined how the handwriting combining sheet SH2 is rotated with respect to the abutting position of the document plate from the position and orientation of the relative position mark 62.

Figure 27:
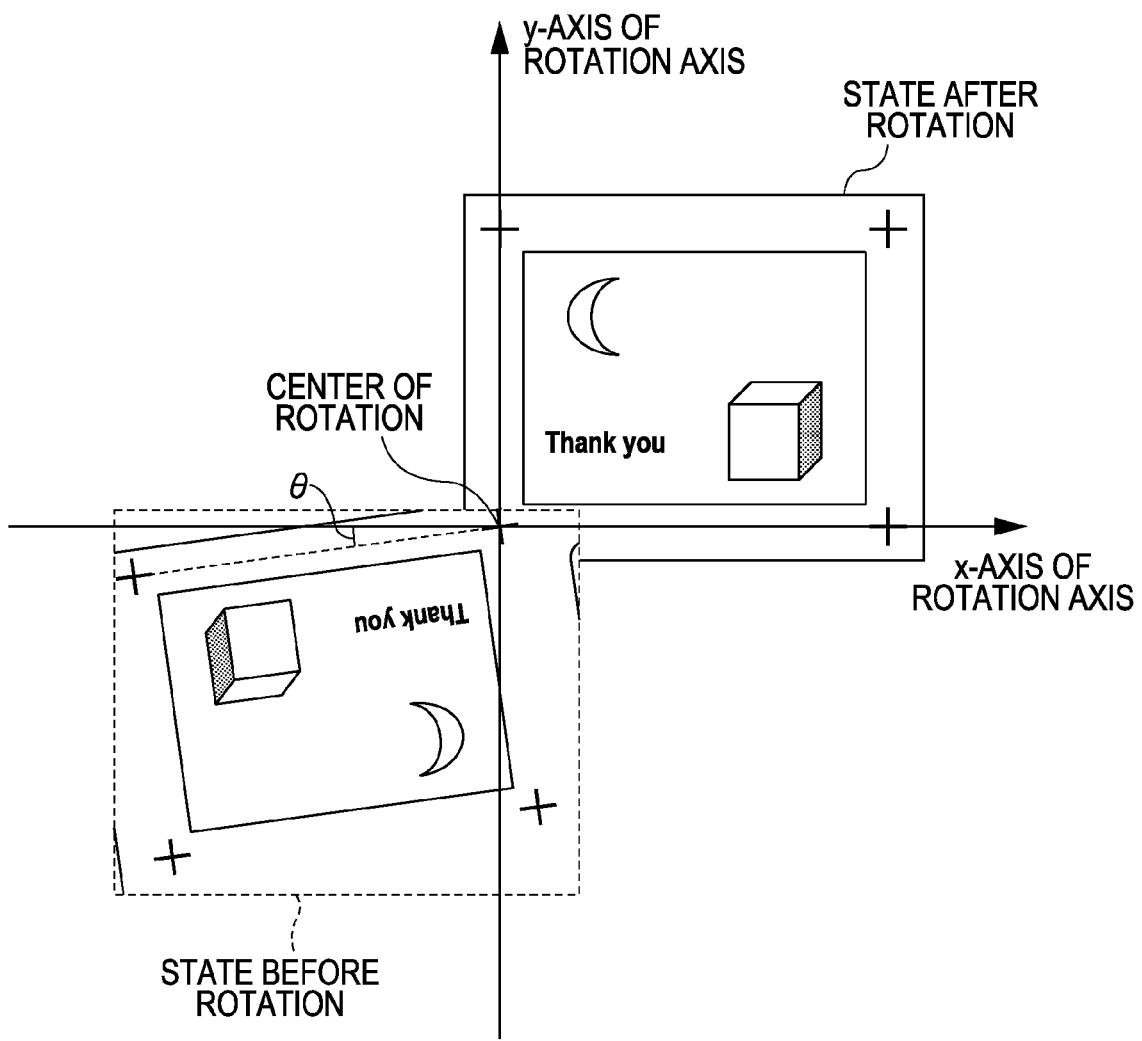
FIG. 27 is a diagram showing the positional relationship of the image on the handwriting combining sheet SH2 placed in an arbitrary orientation before and after transformation in the case where the image is rotationally corrected by affine transformation.

FIG. 27 is a diagram showing the positional relationship of the image on the handwriting combining sheet SH2 placed in an arbitrary orientation before and after transformation in the case where the image is rotationally corrected by affine transformation.

In the example shown in FIGS. 22A to 22B, the relative position mark 62 is located at the right end of the image data, and the arrow points down, which shows the state before rotation, shown in FIG. 27. That is, in this case, rotating the image clockwise by $(\theta+180)°$ brings the image into the proper orientation.

Here, a trigonometric function has a relationship, $\sin(\theta+180°)=-\sin\theta$, $\cos(\theta+180°)=-\cos\theta$. This shows that the negative numbers of $\sin\theta$ and $\cos\theta$ given by Eq. (26a) and Eq. (26b) should be substituted into Eq. (14a) to rotate the image clockwise by $(\theta+180)°$.

As shown in FIG. 27, the coordinates obtained by the substitution are coordinates obtained by rotating the image around the area detecting mark 53b once. Therefore, it also needs to be translated. To translate it, it is necessary to obtain x_shift and y_shift in Eq. (14a). To this end, first, the ideal coordinates of the area detecting mark 53d are obtained. The ideal coordinates of the area detecting mark 53d in this case are a position that is laterally moved from the area detecting mark 53b by a distance, CROSS_W.

FIG. 28 is a diagram showing equations for use in calculating the coordinate position in the case where the image on the handwriting combining sheet SH2 placed in an arbitrary orientation is rotationally corrected by affine transformation. Accordingly, the equations of Eq.(28a), Eq. (28b), and Eq. (28c) shown in FIG. 28 hold. Substituting Eq. (28a) and Eq. (28b) into Eq. (26c) and Eq. (26d) gives the amounts of translation, x_shift and y_shift.

In this way, if the positional relationship between the area detecting marks 53 can be found, and the angle formed by one side of the rectangle formed of the area detecting marks 53a to 53d and one side of image data can be found, the image data is rotated by rotation and translation.

In step S27, after completion of the rotation, a rectangle with a width of AREA_W and a length of AREA_L is cut out with a position (x1+M1, y1+M2) as the starting point that is obtained by adding distances M1 and M2 to the coordinates Q1 of the area detecting mark 53a in FIGS. 15A and 15B. Schematic diagrams thereof are shown in FIGS. 16A and 16B. This image is handled as an image in the handwriting area 54. In step S28, mask data is created using the same method as in step S18. In step S29, the images are combined by the same method as in step S19. The mask data is the mask data shown in FIG. 17B, which is created to discriminate between the handwritten image 55b and the portions 54a and 54b of the picture image.

With the above-described configuration, the handwritten image 55 and a desired image file can be combined in the same orientation even in any orientation the user places the handwriting combining sheet SH2 on the document plate.

The orientation of the handwriting combining sheet SH2 placed on the document plate is determined by adding the relative position mark 62 to the handwriting combining sheet SH1. Instead of adding the relative position mark 62, by using a mark, such as a QR code, that allows determination of the orientation of the sheet with respect to the document plate as the handwriting-combining-sheet identifying mark 51, the method shown in the embodiment using the handwriting combining sheet SH2 may be achieved. It is also possible to determine the orientation of the sheet with respect to the document plate from the positional relationship between the relative position mark 62 and the handwriting-combining-sheet identifying mark 51.

The relative position mark 62 can be used to create the parameters for inclination correction in the embodiment in which the handwriting combining sheet SH1 is used and also to detect the relative position in the embodiment in which the handwriting combining sheet SH2 is used. In this way, the marks for area detection and the marks for inclination detection can be provided separately.

Figure 29:
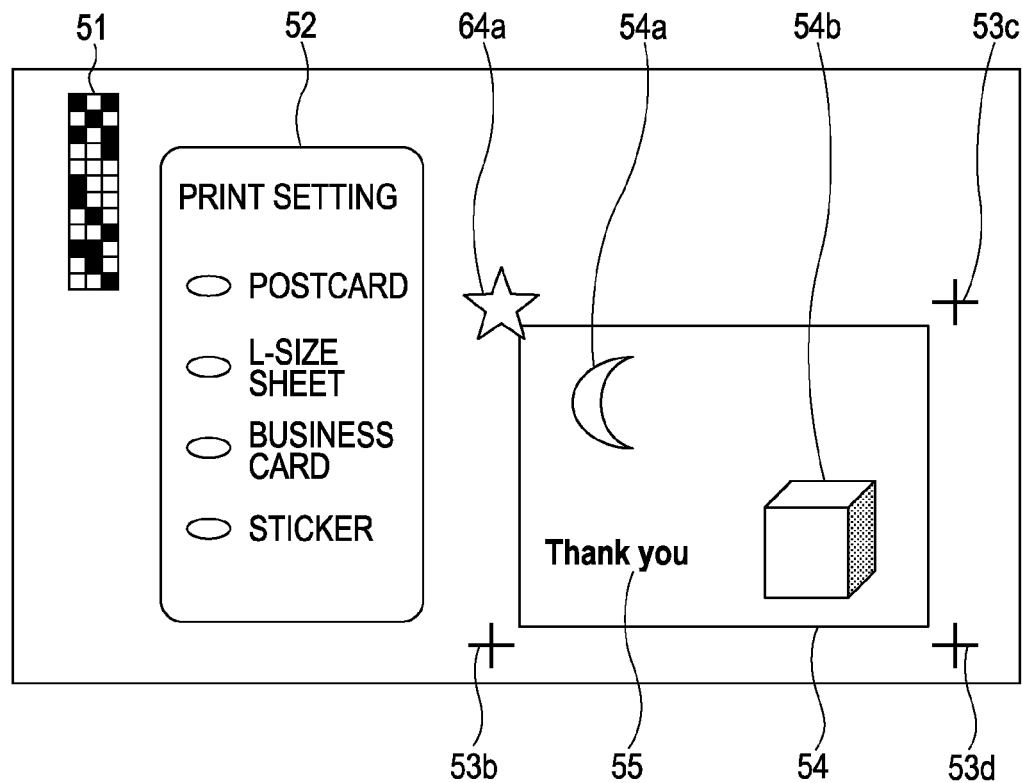
FIG. 29 is a diagram showing a handwriting combining sheet SH3.

Next, another embodiment in which the rotation of the handwriting area is detected by printing different kinds of area detecting mark will be shown. FIG. 29 is a diagram showing a handwriting combining sheet SH3.

This embodiment uses the handwriting combining sheet SH3. The handwriting combining sheet SH3 is a sheet on which an area detecting mark 64a is provided instead of the area detecting mark 53a on the handwriting combining sheet SH1. The shape of the area detecting mark 64a is different from that of the other area detecting marks 53b to 53d. Since the apparatus configuration and the method for printing the handwriting combining sheet are the same as the above-described embodiment using the handwriting combining sheet SH1, detailed descriptions thereof will be omitted.

The operation of this embodiment is substantially the same as in the above embodiment using the handwriting combining sheet SH2. Accordingly, the analysis flowchart is similar to the flowchart shown in FIG. 21. However, in step S22 in FIG. 21, the area detecting mark 64a is detected instead of detecting the position of the relative position mark 62. The matching pattern (pattern matching) for use in this detection is different from that for the other area detecting marks 53b to 53d. Furthermore, in step S24, the cutting position is estimated from the position of the area detecting mark 64a.

In step S25, the area detecting mark 64a has already been detected, and therefore, the remaining three area detecting marks 53b to 53d are detected. In step S26, when determining parameters for rotation, rotation parameters are set so that the area detecting mark 64a with a different shape is located at the upper left after the rotation. With the above-described handwriting combining sheet SH3, the orientation of the sheet with respect to the document plate can be determined while reducing items to be printed on the handwriting combining sheet SH3.

Next, yet another embodiment will be described. In this embodiment, the creation of the mask data in step S18 in the flowchart in FIG. 6 is executed in advance, and only a region where the mask data is present is rotated.

Figure 30:
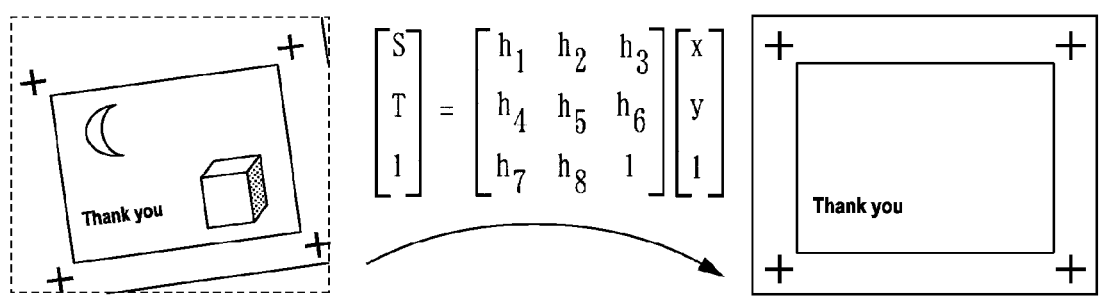
FIG. 30 is a schematic diagram showing an example in which mask data is created for extraction in advance, and then the image is rotated.

FIG. 30 is an explanatory diagram of this embodiment, which schematically shows an example in which the mask data is created for extraction in advance, and then the image is rotated. The amount of image data to be rotated is smaller than that in the case where the rotation of the image is executed before the creation of the mask data, as shown in FIG. 12. This allows the rotating process to be executed more quickly.

Figure 31:
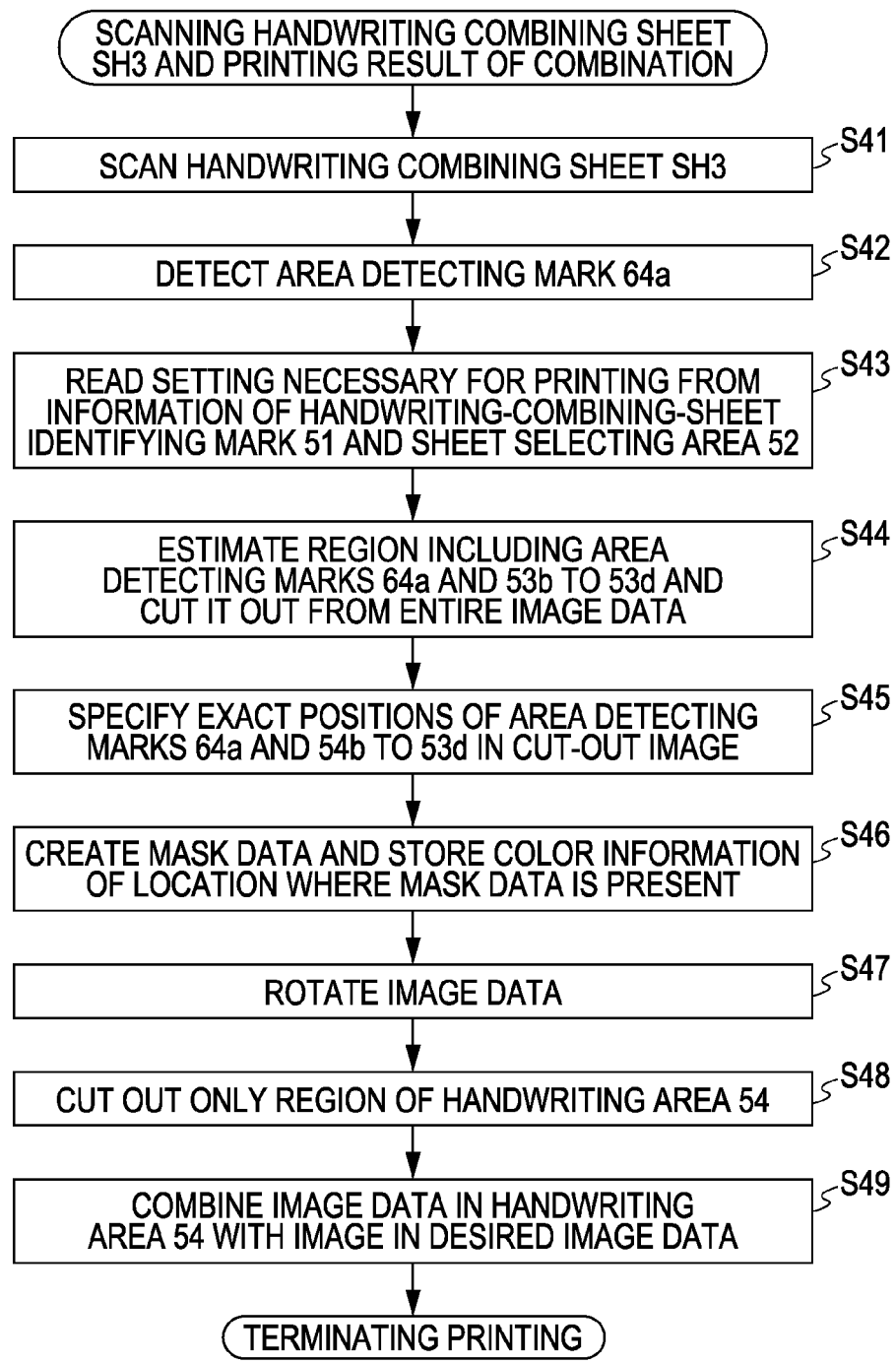
FIG. 31 is a flowchart showing the operation of rotationally correcting an image after creating mask data for extraction.

FIG. 31 is a flowchart showing the operation of rotationally correcting an image after creating mask data for extraction. Since the apparatus configuration, the method for printing the handwriting combining sheet, and the process from step S41 to step S45 are the same as the above-described embodiment using the handwriting combining sheet SH2, detailed descriptions thereof will be omitted.

In step S46, the image cut out using Eq. (18) is set to a value Gray. It is determined whether this value exceeds a threshold value. The coordinates and the color information (brightness values of three RGB colors) of pixels whose value Gray exceeds the threshold value are stored in another region in the RAM 42. In this embodiment, a table that lists the coordinates and the color information is used as mask data. In step S47, the rotation parameters of the image are calculated from the positions of the area detecting marks 53, and the image data is rotated. Since the calculation of the rotation parameters is the same as in the above embodiment using the handwriting combining sheet SH2, a detailed description thereof will be omitted. In step S48, the coordinates stored in the mask data table are transformed to the coordinates of the handwriting area 54. They can be transformed on the basis of the positional relationship among the coordinates of the area detecting marks 53, the area detecting marks 53, and the handwriting area 54 with reference to FIGS. 15A and 15B. In step S49, the handwritten image 55 and the picture image are combined. Since the combining process is the same as that in the embodiment using the handwriting combining sheet SH2, a detailed description thereof will be omitted.

According to the flowchart for handwriting combination shown in FIG. 31, if the amount of image data of the handwritten image 55 is small, the number of pixels subjected to rotation processing can be reduced. This allows the handwritten image 55 to be rotated in a shorter processing time.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-162472 filed Jun. 20, 2008, which is hereby incorporated by reference herein in its entirety.

What is claimed is:

1. An apparatus comprising:
an acquiring unit configured to acquire, by reading with a reading apparatus, a read image of a sheet, wherein print information to be printed is added in a partial region of the sheet by a user, and setting information for identifying a setting related to printing of the print information is included in the sheet, and predetermined information for specifying an inclination and/or an orientation of the sheet is included in the sheet;
a cutting unit configured to cut out a rectangle partial image from the read image, the rectangle partial image corresponding to the partial region of the sheet and including the print information added by the user;
a rotating unit configured to rotate the rectangle partial image cut out by the cutting unit according to the inclination and/or the orientation specified by the predetermined information included in the read image;
an extracting unit configured to extract the print information added by the user from the rectangle partial image rotated by the rotating unit;
an estimating unit configured to estimate a region where rotation is not performed corresponding to the setting information in the read image according to a position of the predetermined information included in the read image without performing a rotation for the setting information in the read image; and
a print control unit configured to cause a printing apparatus to print the print information on a sheet, on the basis of the setting information corresponding to the region estimated by the estimation unit performed by the setting unit.

2. The apparatus according to claim 1, further comprising:
a second cutting unit configured to cut out a region image from the rectangle partial image cut out by the cutting unit and rotated by the rotating unit;
wherein the extracting unit extracts the print information from the region image cut out by the second cutting unit.

3. The apparatus according to claim 1, wherein the estimating unit is further configured to estimate the region according to a position of the predetermined information in the read image.

4. The apparatus according to claim 3 wherein the inclination is specified according to the predetermined information and a plurality of marks.

5. The apparatus according to claim 1, further comprising:
a combining unit configured to combine an image and the print information extracted by the extracting unit;
wherein the print control unit causes the printing apparatus to print a combined image obtained by the combining unit.

6. The apparatus according to claim 5, wherein the setting information identifies the image to be combined with the print information, and the combining unit combines the image identified by the setting information and the print information.

7. The apparatus according to claim 1, further comprising:
a second print control unit configured to cause the printing apparatus to print a sheet image including the partial region and the predetermined information on the sheet;
wherein the acquiring unit acquires the read image, by reading the sheet on which the sheet image is printed by the second print control unit and the print information is added by the user.

8. The apparatus according to claim 7 wherein the second print control unit causes the printing apparatus to print the sheet image further including a mark for specifying the partial region in the read image, and the cutting unit cuts out the rectangle partial image corresponding to the partial region based on the mark included in the read image.

9. The apparatus according to claim 7, further comprising:
a transforming unit configured to transform an image to be combined with the print information to an image showing the image and having a brightness higher than that of the image, wherein
the second print control unit causes the printing apparatus to print the transformed image obtained by the transforming unit in the partial region.

10. The apparatus according to claim 1, wherein the setting information identifies a size of the sheet used in the printing caused by the print control unit.

11. The apparatus according to claim 1, wherein the setting information is added on the sheet corresponding to the read image by a user.

12. A method comprising:
an acquiring step of acquiring a read image, by reading by a reading apparatus, a sheet, wherein print information to be printed is added in a partial region of the sheet by a user and setting information for identifying a setting related to printing of the print information is included in the sheet, and predetermined information for specifying an inclination and/or an orientation of the sheet is included in the sheet;
a cutting step of cutting out a rectangle partial image from the read image, the rectangle partial image corresponding to the partial region of the sheet and including the print information added by the user;
a rotating step of rotating the rectangle partial image cut out in the cutting step according to the inclination and/or orientation specified by the predetermined information included in the read image;
an extracting step of extracting the print information added by the user, from the rectangle partial image rotated in the rotating step;
an estimating step of estimating a region corresponding to the setting information in the read image according to a position of the predetermined information included in the read image without performing a rotation for the setting information in the read image; and
causing a printing apparatus to print the print information on a sheet on the basis of the setting information corresponding to the region estimated in the estimating step.

13. The method according to claim 12, further comprising a second cutting step of cutting out a region image from the rectangle partial image cut out in the cutting step and rotated in the rotating step, wherein the extracting unit extracts the print information from the image cut out by the second cutting step.

14. The method according to claim 12, wherein the estimating step further estimates the region according to a position of the predetermined information of the read image.

15. The method according to claim 12, wherein the inclination is specified according to the predetermined information and print a plurality of marks.

16. The method according to claim 12, further comprising
a combining step of combining an image and the information extracted by the extracting unit, and
causing the printing apparatus to print a combined image obtained by the combining unit.

17. The method according to claim 16, wherein the setting information identifies the image to be combined with the print information, and the combining unit combines the image identified by the setting information and the print information.

18. The method according to claim 12, further comprising:
a second print control step to print a sheet image including the partial region on the sheet;
wherein the acquiring step acquires the read image, by reading the sheet printed in the first print control step with a reading apparatus.

19. The method according to claim 18, wherein the second print control step prints the sheet image including a mark for specifying the partial region in the read image, and the cutting step cuts out the rectangle partial image corresponding to the partial region based on the mark included in the read image.

20. The method according to claim 18, further comprising:
a transforming step of transforming an image to be combined with the print information to an image showing the image and having a brightness higher than that of the image, wherein
the second print control step causes the printer to print the transformed image obtained in the transforming step in the region.

21. A non-transitory computer-readable medium for causing a computer to perform the method according to claim 12.

* * * * *